US012684382B2

(12) United States Patent
Kazmi et al.

(10) Patent No.:  US 12,684,382 B2
(45) Date of Patent:       Jul. 14, 2026

(54) TIMING MEASUREMENT PROCEDURE UNDER SRS ANTENNA PORT SWITCHING

(71) Applicant: Telefonaktiebolaget LM Ericsson (publ), Stockholm (SE)

(72) Inventors: Muhammad Ali Kazmi, Sundbyberg (SE); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 330 days.

(21) Appl. No.: 18/272,787

(22) PCT Filed: Jan. 17, 2022

(86) PCT No.: PCT/IB2022/050358
§ 371 (c)(1),
(2) Date: Jul. 17, 2023

(87) PCT Pub. No.: WO2022/153269
PCT Pub. Date: Jul. 21, 2022

(65) Prior Publication Data
US 2024/0306016 A1      Sep. 12, 2024

Related U.S. Application Data

(60) Provisional application No. 63/138,107, filed on Jan. 15, 2021.

(51) Int. Cl.
*H04B 7/06*       (2006.01)
*H04W 24/08*      (2009.01)
*H04W 64/00*      (2009.01)

(52) U.S. Cl.
CPC .......... *H04W 24/08* (2013.01); *H04B 7/0602* (2013.01); *H04W 64/00* (2013.01)

(58) Field of Classification Search
CPC ..... H04W 24/08; H04W 64/00; H04W 24/10; H04B 7/0602; H04L 5/0023; H04L 5/0051
See application file for complete search history.

(56) References Cited

U.S. PATENT DOCUMENTS

2015/0249527 A1*   9/2015  Hwang ................. H04W 72/20
                                                             370/252
2017/0302419 A1*  10/2017  Liu ........................ H04W 72/23
(Continued)

FOREIGN PATENT DOCUMENTS

WO         2018083630 A1     5/2018

OTHER PUBLICATIONS

Ericsson, "Impact on RRM and positioning requirements", 3GPP TSG RAN WG4 Meeting #101-e, R4-2119464, Electronic Meeting, Nov. 1-12, 2021.
(Continued)

*Primary Examiner* — Kenneth T Lam

(57)       ABSTRACT

A method of operating a wireless device that is configured to perform a timing measurement procedure that involves transmission of a reference signal during a timing measurement period is disclosed. The method includes determining that the wireless device is configured for antenna port switching of an antenna port configuration for transmitting the reference signal during the timing measurement period, and in response to determining that the wireless device is configured for antenna port switching of the antenna port configuration for transmitting the reference signal during the timing measurement period, adapting at least one of the timing measurement procedure during the timing measurement period and a configuration for antenna port switching of the antenna port configuration for transmitting the reference signal during the timing measurement period.

13 Claims, 15 Drawing Sheets

Wireless Device UE
Operations

(56)            References Cited

U.S. PATENT DOCUMENTS

| 2019/0260487 A1 * | 8/2019 | Kazmi | ................. | H04B 17/382 |
| 2019/0305918 A1 * | 10/2019 | Siomina | ................ | H04L 5/0053 |
| 2020/0259683 A1 * | 8/2020 | Manolakos | ......... | H04L 25/0226 |
| 2023/0147639 A1 * | 5/2023 | Go | ........................ | H04L 5/0023 |
| | | | | 455/101 |
| 2023/0171055 A1 * | 6/2023 | Manolakos | ........... | H04L 5/0092 |
| | | | | 370/329 |
| 2023/0216639 A1 * | 7/2023 | Wang | ................... | H04L 5/0035 |
| | | | | 370/329 |

OTHER PUBLICATIONS

Samsung, "Issues on SRS", 3GPP TSG RAN WG1 Meeting AH 1801, R1-1800439, Vancouver, Canada, Jan. 22-26, 2018.

* cited by examiner

| Symbol #0 | ... | SRS1 (Tx1) | Guard | SRS2 (Tx2) | ... | Symbol #13 | Time |

Figure 3

| Symbol #0 | ... | SRS1 (Tx1,Tx2) | Guard | SRS2 (Tx3,Tx4) | ... | Symbol #13 | Time |

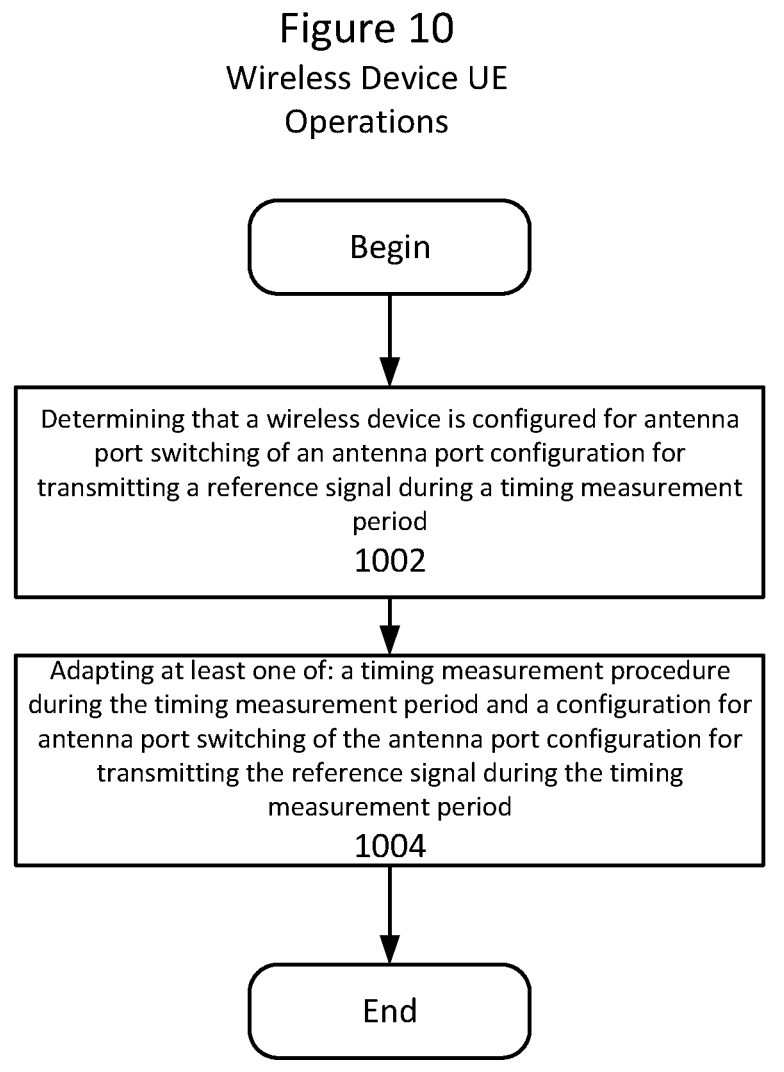

Figure 10
Wireless Device UE
Operations

Begin

Determining that a wireless device is configured for antenna port switching of an antenna port configuration for transmitting a reference signal during a timing measurement period

1002

Adapting at least one of: a timing measurement procedure during the timing measurement period and a configuration for antenna port switching of the antenna port configuration for transmitting the reference signal during the timing measurement period

1004

End

Network Node Operations

Figure 12
Network Node Operations

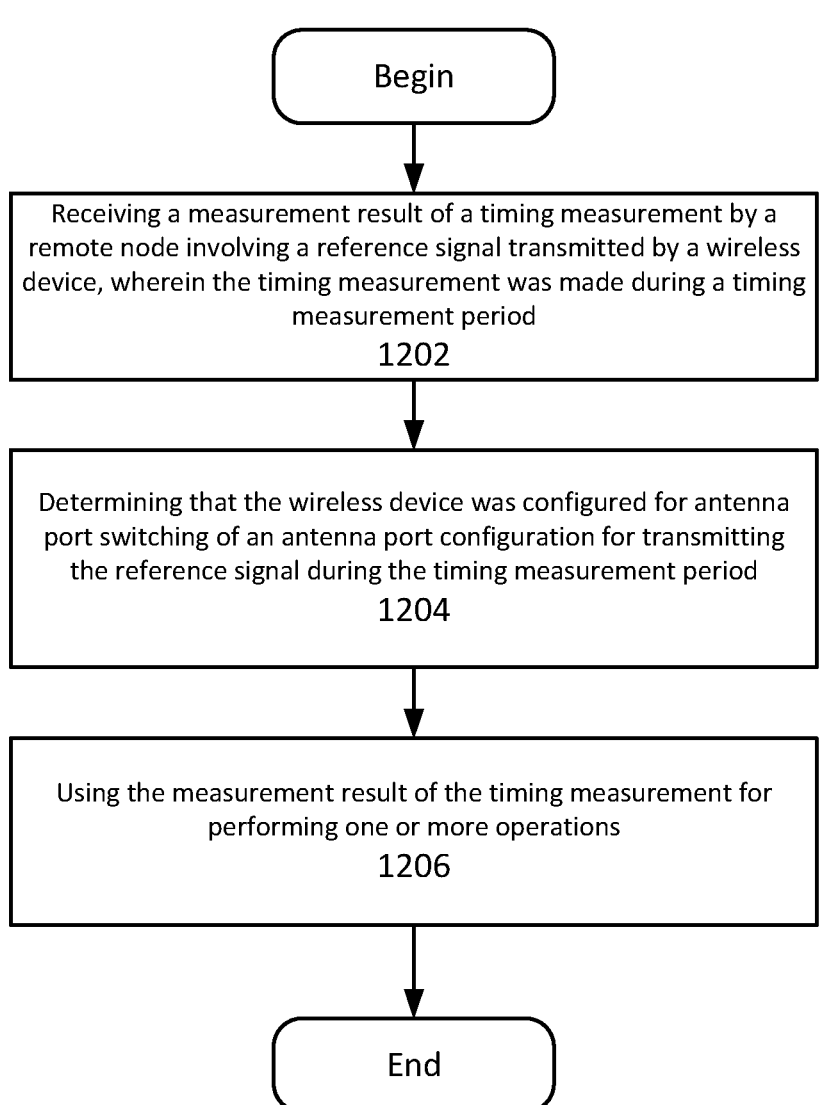

Begin

Receiving a measurement result of a timing measurement by a
remote node involving a reference signal transmitted by a wireless
device, wherein the timing measurement was made during a timing
measurement period
1202

Determining that the wireless device was configured for antenna
port switching of an antenna port configuration for transmitting
the reference signal during the timing measurement period
1204

Using the measurement result of the timing measurement for
performing one or more operations
1206

End

TIMING MEASUREMENT PROCEDURE UNDER SRS ANTENNA PORT SWITCHING

RELATED APPLICATIONS

This application is a national phase application of International Patent Application No. PCT/IB2022/050358, filed Jan. 17, 2022, which claims the benefit of U.S. Provisional Patent Application No. 63/138,107 filed Jan. 15, 2021, entitled "TIMING MEASUREMENT PROCEDURE UNDER SRS ANTENNA PORT SWITCHING,", the disclosure of which are hereby incorporated herein by reference in their entirety.

TECHNICAL FIELD

The present disclosure relates generally to communications, and more particularly to communication methods and related devices and nodes supporting wireless communications.

BACKGROUND

The New Radio (NR) architecture is being standardized in 3GPP. The NR architecture is sometimes referred to as the 5G or Next Generation architecture. The current concept for NR is illustrated in FIG. 1, where gNB and ng-eNB (or evolved eNB) denote NR base stations (BS). In NR, one BS may correspond to one or more transmission/reception points (TRPs). In FIG. 1, the lines between the nodes illustrate the corresponding interfaces.

The location management function (LMF) is the location node in NR. There are also interactions between the LMF and the gNB via the NRPPa protocol (not illustrated in FIG. 1) and between the UE and the location server via NR LPP. The interactions between the gNB and the UE are supported via the Radio Resource Control (RRC) protocol.

Timing Measurements for UE Positioning in NR

A timing measurement is performed by a radio node (e.g. a UE, a BS location management unit, LMU, etc.) to estimate timing of a signal received (Rx) by the radio node, timing of a signal transmitted (Tx) by the radio node or a relation (e.g., difference) between timings of received and transmitted signals. Some non-limiting examples of timing measurements are propagation delay between the radio node and another node, round trip time (RTT), timing advance (TA), timing measurements related to UE positioning, etc.

In NR several UE and network node (e.g. BS, gNB, LMU etc.) timing measurements related to positioning are specified. Some examples of timing measurement performed by the UE (i.e., a UE timing measurement) for positioning are round trip time (RTT), UE Rx-Tx time difference, multi-RTT, etc. The UE Rx-Tx time difference is also referred to as a UE RTT measurement.

A UE may be configured to perform multiple RTT measurements, referred to as multi-RTT measurements, which may include at least one RTT measurement on signals of one serving cell or TRP (e.g. PCell, PSCell etc.) and at least one RTT measurement on signals of another cell or TRP (such as a neighbor cell, another serving cell etc.).

Some examples of timing measurements performed by a network node (e.g. gNB/BS/LMU timing measurement) for positioning are gNB Rx-Tx time difference, UL Relative Time of Arrival uplink (UL RTOA), eNB TA type 1, eNB TA type 2, gNB TA, gNB TA type 1, gNB TA type 2, etc.

The UE Rx-Tx time difference is defined as TUE-RX-TUE-TX, where TUE-RX is the UE received timing of downlink subframe #i from a positioning node, defined by the first detected path in time. It is measured on positioning reference signal (PRS) signals received from the gNB. TUE-TX is the UE transmit timing of uplink subframe #j that is closest in time to the subframe #i received from the positioning node. It is measured on sounding reference signal (SRS) signals transmitted by the UE.

The gNB Rx-Tx time difference is defined as TgNB-RX-TgNB-TX, where TgNB-RX is the positioning node received timing of uplink subframe #i containing SRS associated with UE, defined by the first detected path in time. It is measured on SRS signals received from the UE.

TgNB-TX is the positioning node transmit timing of downlink subframe #j that is closest in time to the subframe #i received from the UE. It is measured on PRS signals transmitted by gNB.

The UL RTOA is measured by the beginning of subframe i containing SRS received in Reception Point (RP) j, relative to the RTOA Reference Time. A RP may be a radio network node, such as a gNB, LMU, etc. The reference time may further depend on system frame number (SFN), subframe number, etc.

Reference Signals for NR RTT Positioning Measurements

Positioning Reference Signals

Positioning reference signal (PRS) are periodically transmitted on a positioning frequency layer in PRS resources in the downlink (DL) by the gNB. PRS are used for both UE Rx-Tx and gNB Rx-Tx time difference measurements. The information about the PRS resources is signaled to the UE by the positioning node via higher layers, but may also be provided by base station, such as via broadcast. Each positioning frequency layer comprises PRS resource sets, where each PRS resource set comprises one or more PRS resources. All the DL PRS resources within one PRS resource set are configured with the same periodicity.

The PRS resource periodicity ($T_{per}^{PRS}$) includes:

$T_{per}^{PRS} \in 2^\mu \{4,8,16,32,64,5,10,20,40,80,160,320,640, 1280,2560,5120,10240,20480\}$ slots, where $\mu=0,1,2,3$ for PRS SCS of 15, 30, 60 and 120 kHz respectively. $T_{per}^{PRS}=2^\mu \cdot 20480$ is not supported for $\mu=0$.

Each PRS resource can also be repeated within one PRS resource set and takes values $T_{rep}^{PRS} \in \{1,2,4,6,8,16,32\}$.

PRS are transmitted in consecutive number of symbols (LPRS) within a slot: $L_{PRS} \in \{2,4,6,12\}$. The following DL PRS RE patterns, with comb size $K_{PRS}$ equal to number of symbols $L_{PRS}$ are supported Comb-2: Symbols $\{0, 1\}$ have relative RE offsets $\{0, 1\}$ Comb-4: Symbols $\{0, 1, 2, 3\}$ have relative RE offsets $\{0, 2, 1, 3\}$ Comb-6: Symbols $\{0, 1, 2, 3, 4, 5\}$ have relative RE offsets $\{0, 3, 1, 4, 2, 5\}$ The maximum PRS bandwidth (BW) is 272 physical resource blocks (PRBs). The minimum PRS BW is 24 PRBs. The configured PRS BW is always a multiple of 4.

Sounding Reference Signals

For positioning timing measurements (e.g. UE Rx-Tx, gNB, Rx-Tx, UL RTOA, etc.), the UE is configured with SRS for uplink transmission. The SRS include one or more SRS resource sets, with each SRS resource set including one or more SRS resources. Each SRS resource includes one or more symbols carrying SRS with a certain SRS bandwidth. There can be periodic SRS, aperiodic SRS, and semi-persistent SRS transmissions, any of which can also be used for positioning measurements.

There are two options for SRS configuration for positioning:

In one example the UE can be configured with SRS resource set where each SRS resource occupies $N_S \in \{1,2,4\}$ adjacent symbols within a slot. In this case SRS antenna switching is supported. Each symbol can also be repeated with repetition factor $R \in \{1,2,4\}$, where $R \le N_s$. The periodic SRS resource can be configured with certain periodicity ($T_{SRS}$). $T_{SRS} \in \{1, 2, 4, 5, 8, 10, 16, 20, 32, 40, 64, 80, 160, 320, 640, 1280, 2560\}$ slots.

In another example the UE can be configured with SRS positioning specific resource set (SRS-PosResourceSet). In this case each SRS positioning resource (SRS-PosResource) occupies $N_S \in \{1,2,4,8,12\}$ adjacent symbols within a slot. In this case SRS antenna switching is not supported.

In both options, the UE can be configured with 1, 2 or 4 antenna ports for transmitting each SRS resource within an SRS resource set. The default value is one SRS antenna port for each SRS resource.

SRS Antenna Port Switching

The UE can further be configured with SRS antenna port switching by the higher layer parameter "antennaSwitching". This allows the UE to switch between 2 or more SRS antenna ports for transmitting the SRS resource. When SRS antenna switching is enabled, the UE is further configured with 1 or more guard symbols (Y) between SRS resources if they are configured within the same slot. The UE does not transmit anything in the guard symbols. SRS antenna port switching enables the UE to achieve transmit diversity for SRS transmission on the same carrier frequency, which may enhance the performance of SRS.

SRS antenna port switching may also be referred to as SRS antenna switching, or simply antenna port switching or antenna switching. This is different from SRS carrier-based switching, which is switching among two or more carriers for transmitting SRS to enable channel sounding in TDD for UE with limited carrier aggregation (CA) capability.

FIG. 2 illustrates an example showing a UE configured with 2 SRS resources (SRS1 and SRS2) within a slot, where each SRS resource includes one symbol. Both SRS resources are configured with the same SRS antenna port (Tx1). In this case, there is no antenna switching, since both SRS resources are transmitted via the same antenna port, namely Tx1 in this example.

Figures 3, 4:
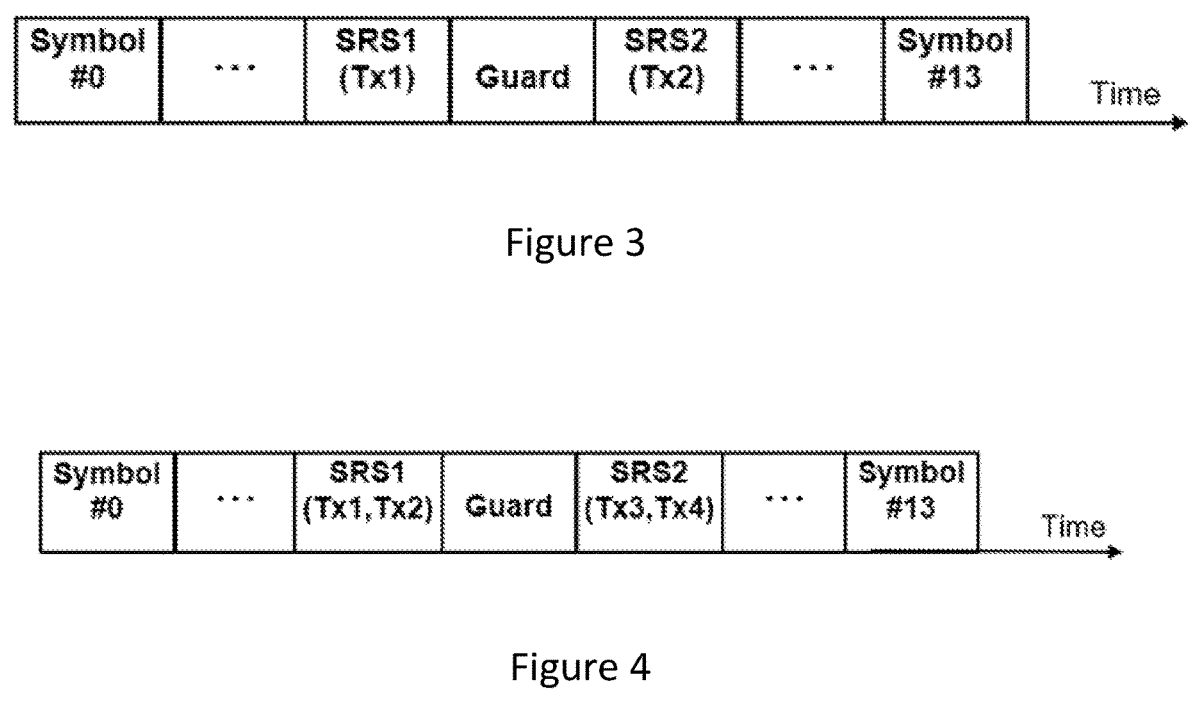

FIG. 3 illustrates an example showing a UE configured with 2 SRS resources (SRS1 and SRS2) within a slot where each SRS resource also includes one symbol. SRS1 and SRS2 are configured with SRS antenna port #1 (Tx1) and SRS antenna port #2 (Tx2) respectively. The SRS1 and SRS2 resources are separated by one guard symbol. In this case, there is antenna switching across SRS1 and SRS2, since both SRS resources are transmitted using different antenna ports.

FIG. 4 illustrates an example showing a UE configured with 2 SRS resources (SRS1 and SRS2) where each SRS resource (SRS1 and SRS2) is configured with two different SRS antenna ports. That is, SRS1 is configured with antenna ports #1 and #2 (Tx1 and Tx2) and SRS2 is configured with antenna ports #3 and #4 (Tx3 and Tx4). In this case, antenna switching is performed, because each of SRS1 and SRS2 are transmitted by different pairs of antenna ports.

SUMMARY

Some embodiments provide a method of operating a wireless device that is configured to perform a timing measurement procedure that involves transmission of a reference signal during a timing measurement period. The method includes determining that the wireless device is configured for antenna port switching of an antenna port configuration for transmitting the reference signal during the timing measurement period; and in response to determining that the wireless device is configured for antenna port switching of the antenna port configuration for transmitting the reference signal during the timing measurement period, adapting at least one of: the timing measurement procedure during the timing measurement period and a configuration for antenna port switching of the antenna port configuration for transmitting the reference signal during the timing measurement period.

A wireless device according to some embodiments includes processing circuitry and memory coupled with the processing circuitry. The memory includes instructions that when executed by the processing circuitry causes the wireless device to perform operations according to the above method.

A wireless device according to some embodiments is adapted to perform operations according to the above method.

A computer program according to some embodiments includes program code to be executed by processing circuitry of a wireless device, whereby execution of the program code causes the wireless device to perform operations according to the above method.

A computer program product according to some embodiments includes a non-transitory storage medium including program code to be executed by processing circuitry of a wireless device, whereby execution of the program code causes the wireless device to perform operations according to the above method.

Some embodiments provide a method of operating a network node that serves a wireless device that is configured to transmit a reference signal during a timing measurement period. The method includes determining that the wireless device is configured for antenna port switching of an antenna port configuration for transmitting the reference signal during the timing measurement period; and adapting a timing measurement procedure during the timing measurement period in response to determining that the wireless device is configured for antenna port switching of the antenna port configuration for transmitting the reference signal during the timing measurement period.

Some embodiments provide a method of operating a network node. The method includes receiving a measurement result of a timing measurement by a remote node involving a reference signal transmitted by a wireless device, wherein the timing measurement was made during a timing measurement period; determining that the wireless device was configured for antenna port switching of an antenna port configuration for transmitting the reference signal during the timing measurement period; and using the measurement result of the timing measurement for performing one or more operations.

A network node according to some embodiments includes processing circuitry and memory coupled with the processing circuitry. The memory includes instructions that when executed by the processing circuitry causes the network node to perform operations according to any of the above methods.

A network node according to some embodiments is adapted to perform operations according to any of the above methods.

A computer program according to some embodiments includes program code to be executed by processing circuitry of a network node, whereby execution of the program code causes the network node to perform operations according to any of the above methods.

A computer program product according to some embodiments includes a non-transitory storage medium including program code to be executed by processing circuitry of a network node, whereby execution of the program code causes the network node to perform operations according to any of the above methods.

Some embodiments described herein provide systems/methods that may mitigate or avoid the effect of antenna port switching on timing measurements. This may help to reduce the potentially harmful effect of antenna switching on positioning accuracy.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 3 illustrates an example of two SRS resources (SRS1 and SRS2) within a slot configured for transmission with different antenna ports;

FIG. 4 illustrates an example of two SRS resources (SRS1 and SRS2) within a slot configured for transmission with different pair of antenna ports;

FIG. 10 is a flow chart illustrating operations of a user equipment according to some embodiments of inventive concepts;

FIGS. 11 and 12 are flow charts illustrating operations of network nodes according to some embodiments of inventive concepts;

DETAILED DESCRIPTION

Figures 1, 2:
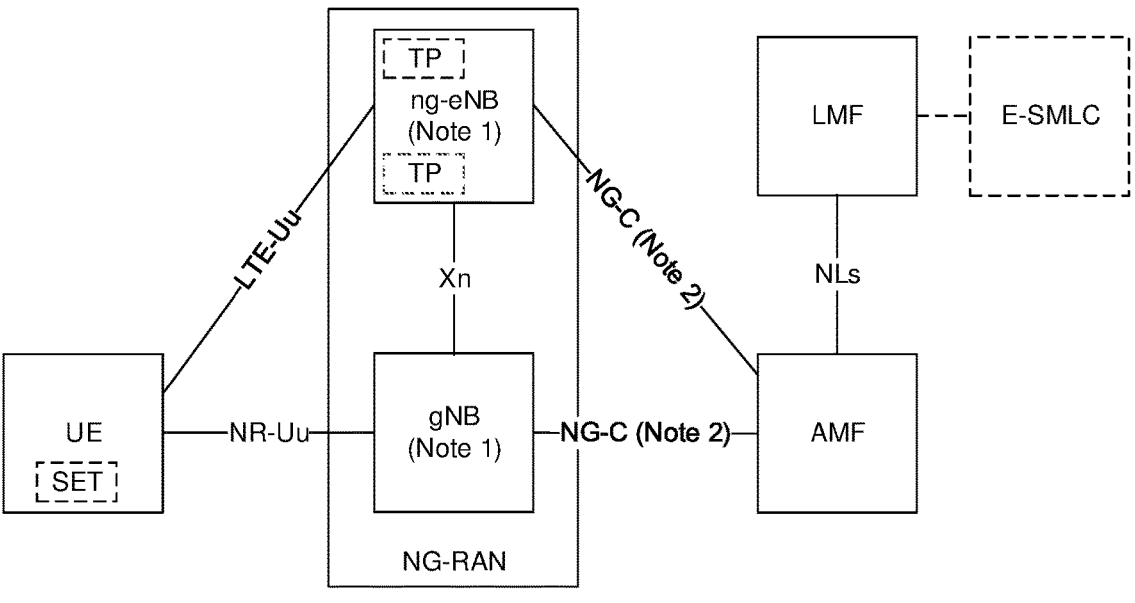
FIG. 1 illustrates an example structure of a NR system.
FIG. 2 illustrates an example of two SRS resources (SRS1 and SRS2) within a slot configured for transmission with the same antenna port.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

In this disclosure, the term "node" is used to refer to an element of a communication network. A node can be a network node or a user equipment (UE).

Examples of network nodes include NodeB, base station (BS), multi-standard radio (MSR) radio node such as MSR BS, eNodeB, gNodeB. MeNB, SeNB, location measurement unit (LMU), integrated access backhaul (IAB) node, network controller, radio network controller (RNC), base station controller (BSC), relay, donor node controlling relay, base transceiver station (BTS), Central Unit (e.g. in a gNB), Distributed Unit (e.g. in a gNB), Baseband Unit, Centralized Baseband, C-RAN, access point (AP), transmission points, transmission nodes, transmission reception point (TRP), RRU, RRH, nodes in distributed antenna system (DAS), core network node (e.g. MSC, MME etc.), O&M, OSS, SON, positioning node (e.g. E-SMLC), etc.

The non-limiting term UE refers to any type of wireless device communicating with a network node and/or with another UE in a cellular or mobile communication system. Examples of UE are target device, device to device (D2D) UE, vehicular to vehicular (V2V), machine type UE, MTC UE or UE capable of machine to machine (M2M) communication, PDA, tablet, mobile terminals, smart phone, laptop embedded equipment (LEE), laptop mounted equipment (LME), USB dongles etc.

The term radio access technology, or RAT, may refer to any RAT e.g. UTRA, E-UTRA, narrow band internet of things (NB-IoT), WiFi, Bluetooth, next generation RAT, New Radio (NR), 4G, 5G, etc. Any of the equipment denoted by the term node, network node or radio network node may be capable of supporting a single or multiple RATs.

The term signal or radio signal used herein can be any physical signal or physical channel. Examples of DL physical signals are reference signal such as PSS, SSS, CSI-RS, DMRS, signals in SSB, DRS, PRS etc. Examples of UL physical signals are reference signal such as SRS, DMRS etc. The term physical channel refers to any channel carrying higher layer information e.g. data, control etc. Examples of physical channels are PBCH, NPBCH, PDCCH, PDSCH, sPUCCH, SPDSCH, sPUCCH, sPUSCH, MPDCCH, NPDCCH, NPDSCH, E-PDCCH, PUSCH, PUCCH, NPUSCH etc.

The term time resource used herein may correspond to any type of physical resource or radio resource expressed in terms of length of time. Examples of time resources are: symbol, time slot, subframe, radio frame, TTI, interleaving time, slot, sub-slot, mini-slot, etc.

As noted above, a UE can be configured for antenna port switching for the transmission of reference signals, such as SRS, that are used in various timing measurements by the UE or a network node.

One problem that can arise when timing measurements are taken while antenna port switching is being performed by a UE is that the transmit timing between signals transmitted using different antenna ports may not be perfectly aligned with respect to each other. This can lead to transmit time misalignment between transmissions on different antennas. Such misalignment is also referred to as transmit time misalignment error or time alignment error (TAE).

Figure 5:
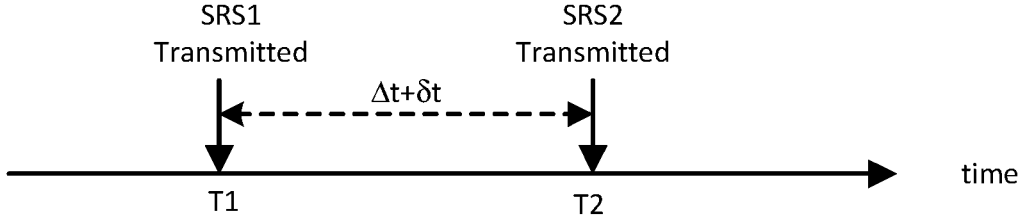
FIG. 5 illustrates timing differences between reference signal transmissions.

In one example, TAE is defined as the average frame timing difference between any two transmissions on different transmit antenna connectors. For example, referring to FIG. 5, a UE mayu be configured to transmit reference signal SRS1 using SRS antenna port #1 (Tx1) at time instance T1, and to transmit reference signal SRS2 using SRS antenna port #2 (Tx2) at time instance T2. Ideally, the magnitude of the timing difference (DT) between transmission of SRS1 and SRS2 should be $\Delta T = T2 - T1$, where DT is deterministic. In practice however, due to TAE, the magnitude of the transmission timing difference ($\Delta T'$) will be $\Delta T' = \Delta T \pm \delta t$. In one example $\delta t = TAE$, and in another example $\delta t = TAE/2$, etc.

TAE is a statistical variable and may depend on factors such as temperature, UE implementation/resources, number of antennas, form factor or size of the UE, separation between T1 and T2, etc.

As an example, a TAE of 130 ns corresponds to a positioning error of about 40 m. In another example, a TAE of 260 ns corresponds to a positioning error of about 80 m. Therefore, the use of different antennas for SRS transmissions during SRS based timing measurements (such as UE Rx-Tx time difference, gNB Rx-Tx time difference, ULRTOA, etc.) for positioning may lead to large positioning errors if the SRS transmissions from different antenna ports are used for the timing measurement in the same way as if they were transmitted from the same antenna port.

According a first embodiment, a UE may perform, or be configured to perform, a timing measurement (M1) involving at least a first reference signal (RS1) over a measurement time period (Tm1). The UE may adapt one or more measurement procedure related to the timing measurement M1 upon determining that the UE may perform or is performing RS1 antenna port switching during the measurement time period Tm1.

The measurement time Tm1 may include, for example, any of: the time during which the measurement is performed, the time during which the UE is configured to transmit reference signal RS1 to enable the timing measurement M1, the time starting from the RS1 activation time in relation to the timing measurement M1 (e.g., when RS1 is activated by the serving gNB) until the RS1 deactivation time, etc.

Examples of adapting the measurement procedure include the following:

Example 1. Adapting the measurement procedure may include ensuring that the number of RS1 antenna port switching actions (N1) during Tm1 does not exceed a certain threshold (N1max). For example, a UE may ensure that it will not perform a number of RS1 antenna switching actions resulting in N1>N1max over measurement time period Tm1. As a special case, N1max may be equal to zero. That is, in some embodiments, the UE may not perform RS1 antenna switching during the measurement time period Tm1.

Example 2. If N1>N1max during the measurement time period Tm1, then the UE may adapt the measurement procedure by performing one or more tasks, such as discarding the timing measurement M1, restarting the timing measurement M1, stopping or abandoning the timing measurement M1, informing another node (such as a BS or positioning node) that N1>N1max, performing the timing measurement M1 over an extended measurement time period (Tm11) (where Tm11>Tm1), etc.

Example 3. Adapting the measurement procedure may include compensating the timing measurement results to account for RS1 antenna port switching.

Example 4. Adapting the measurement procedure may include informing another node (such as a BS or positioning node) about N1 regardless of whether N1 exceeds N1max or not, or about any information related to the adaptation of the measurement procedure.

Example 5. Adapting the measurement procedure may include informing another node about the UE's intention (or current configuration) or capability to perform RS1 antenna switching in general or specifically for the timing measurement M1, the measurement time period Tm1, or a timing measurement M2 performed by a network node during a second measurement time period Tm2.

Example 6. Adapting the measurement procedure may include using a single antenna port for performing the timing measurement M1 even if the RS1 switching is performed during Tm1. For example, for UE Rx-Tx, the UE may determine the Tx time at every time instance t_i during Tm1 for the same antenna port, even when RS1 is transmitted from another antenna port at that time instance t_i.

Example 7. Adapting the measurement procedure may include using for M1 only a subset of all time instances t_i configured for RS1 transmissions during Tm1, wherein the time instances t_i are all configured for RS1 transmissions, and the subset includes only time instances t_i when RS1 is transmitted from the same antenna port.

Some embodiments may be a combination of #1 and #7. That is, the UE may either not perform antenna switching beyond the maximum number allowed (with N1max=0 as a special case) or the UE may select a subset of time instances for performing measurement M1 to include only the time instances associated with the same RS1 antenna port.

According to a second embodiment, a first network node (e.g., a BS) may perform or be expected to perform a timing measurement (M2) involving at least a first reference signal (RS1) over a measurement time period (Tm2). In this embodiment, the first network node adapts one or more measurement procedures related to the timing measurement M2 upon determining that the UE may perform or is performing RS1 antenna port switching during the measurement time period Tm2. The measurement time period Tm2 may also include, for example, any of: the time during which the measurement is performed, the time during which the UE is configured to transmit RS1 to enable the timing measurement M2, the time starting from the RS1 activation time in relation to the timing measurement M2 (such as when RS1 is activated by the serving gNB) until the RS1 deactivation time, etc.

If the number of RS1 antenna port switching actions (N2) during measurement time period Tm2 exceeds a predetermined threshold (e.g., N2max) then the node may perform one or more actions to adapt the measurement procedure. As a special case N2max=0. Examples of actions that the node may take to adapt the measurement procedure include discarding the timing measurement M2, restarting the timing measurement M2, stopping or abandoning the timing measurement M2, informing another node (e.g. positioning node) that N2>N2max, performing the timing measurement M2 over an extended measurement time (Tm21) (where Tm21>Tm2), informing another node (e.g. positioning node) about N2 regardless of whether N1 exceeds N1max or not, requesting UE not to perform a number of RS1 antenna port switching actions by more than N2max over measurement time period Tm1, compensating the timing measurement results to account for RS1 antenna port switching etc.

Examples of adapting the measurement procedure by the network node include applying an adaptation upon determining that the UE is using RS1 antenna port switching or is capable of doing this, and not applying the adaptation otherwise. The node may determine that UE is performing antenna port switching or is adapted to perform antenna port switching based on an indication by the UE, by a positioning node or by the serving BS of the UE.

According to a third embodiment, a second network node (e.g., a positioning node) obtains a measurement result of a timing measurement performed by a node on a reference signal RS1 over a measurement time period (Tm3) and obtains information about RS antenna port switching performed by the UE during the measurement time period T3. In response to the information, the second network node performs one or more actions, such as discarding the measurement, adapting or modifying the measurement results, adapting the assistance data sent to the node, etc. The information may include, for example, information about whether UE is using or intending to use RS1 antenna port switching or is capable of performing antenna port switching.

Examples of the reference signal RS1 include uplink reference signals, SRS, etc. Examples of timing measurements performed by the UE include timing measurements for general purpose/operation (such as propagation delay, round trip time, etc.), timing measurements for positioning (such as UE Rx-Tx time difference, multi-RTT, etc.). Examples of timing measurements performed by the network node include timing measurements for general purpose/operation (such as propagation delay, timing advance, etc.), and timing measurements for positioning (such as gNB Rx-Tx time difference, UL RTOA, timing advance, etc.).

Some embodiments described herein may provide certain advantages. For example, some embodiments may enhance overall UE positioning accuracy when a positioning method is utilized that uses an SRS timing measurement that performed while SRS antenna port switching.

Some embodiments may allow a UE to perform SRS antenna port switching while also doing timing measurement. Some embodiments may help to ensure more consistent UE behavior, leading to more consistent performance for timing positioning measurement.

A first example of a scenario including a UE configured to perform a timing measurement (M1) involving at least a first reference signal (RS1) transmitted by the UE in a serving cell (cell1). The timing measurement M1, may further involve one or more additional reference signals e.g. a second reference signal (RS2). As an example reference signal RS2 may be a RS received by the UE from cell1 or from another cell (cell2). Cell2 may or may not be the serving cell of the UE. For example, the timing measurement M1 may include estimating or measuring or determining the transmit timing of RS1 during the measurement time (Tm1) of the timing measurement M1. In another example, the timing measurement M1 may include estimating or measuring or determining the relation between the transmit timing of RS1 and the reception timing of RS2 during the measurement time period Tm1. Examples of such relations include a difference, ratio, sum, maximum, minimum, etc., of the timing measurements.

The measurement time period Tm1 may also be referred to as a measurement period, L1 measurement period, evaluation period, etc. The measurement time period Tm1 may include, for example, any of: the time during which the measurement is performed, the time during which the UE is configured to transmit RS1 to enable the timing measurement M1, the time starting from the RS1 activation time in relation to the timing measurement M1 (e.g., when RS1 is activated by the serving gNB) until the RS1 deactivation time, etc.

Examples of the timing measurement M1 are UE Rx-Tx time difference, propagation delay, round trip time etc. The UE may further be configured to performing RS1 antenna port switching during Tm1. For example the UE may be configured to transmit RS1 using: antenna port #1 (Tx1) in a first time resource (R1) and antenna port #2 (Tx2) in a second time resource (R2); where R1 and R2 are different time resources e.g. R1 and R2 are symbol #2 and symbol #4 in a slot. Tx1 and Tx2 may also be called as RS1 antenna port #1 and RS1 antenna port #2. The UE may further be configured to use the measurement results of the timing measurement M1 for one or more tasks e.g. for determining UE location, for transmitting results to another node (e.g. BS, positioning node, etc.).

A second example of scenario including a first network node (NW1) (e.g. base station, TRP, LMU etc.) configured to perform a timing measurement (M2) involving at least a reference signal RS1 transmitted by the UE in cell1. The first network node NW1 receives at least RS1 from the UE. The timing measurement M2, may further involve one or more additional reference signals e.g. RS2. As an example RS2 may be transmitted by NW1 to the UE in cell1 or in cell2. For example, the timing measurement M2 may include estimating or measuring or determining the received timing of RS1 at the first network node NW1 during the measurement time period (Tm2) of the timing measurement M2. In another example, the timing measurement M2 may include estimating or measuring or determining the relation between the received timing of RS1 and the transmit timing of RS2 during the measurement time period Tm2.

The measurement time period Tm2 may also include, e.g., any of: the time during which the measurement is performed, the time during which the UE is configured to transmit RS1 to enable the timing measurement M2, the time starting from the RS1 activation time in relation to M2 (e.g., when RS1 is activated by the serving gNB) until the RS1 deactivation time, etc. Examples of relation are difference, ratio, sum, maximum, minimum etc. The measurement time period Tm2 may also be referred to as measurement period, L1 measurement period, evaluation period etc. Examples of the timing measurement M2 are gNB Rx-Tx time difference, propagation delay, timing advance, round trip time, UL RTOA etc. The UE may further be configured to performing RS1 antenna port switching during Tm2 as explained above. The first network node NW1 may further be configured to use the measurement results of M2 for one or more tasks e.g. for determining UE location, for transmitting results to another node (e.g. positioning node etc.).

Examples of RS1 and RS2 are SRS and PRS respectively. An example of RS1 antenna port is SRS antenna port. Examples of serving cells are special cell (SpCell), secondary cell (SCell). Examples of SpCell are PCell, PSCell etc. The UE is configured with at least PCell but may also be configured with PSCell and/or SCell in multicarrier (MuC) operation e.g. carrier aggregation (CA), dual connectivity (DC) etc. Examples of DC are MR-DC, EN-DC, NE-DC, NR-DC etc.

Figure 6:
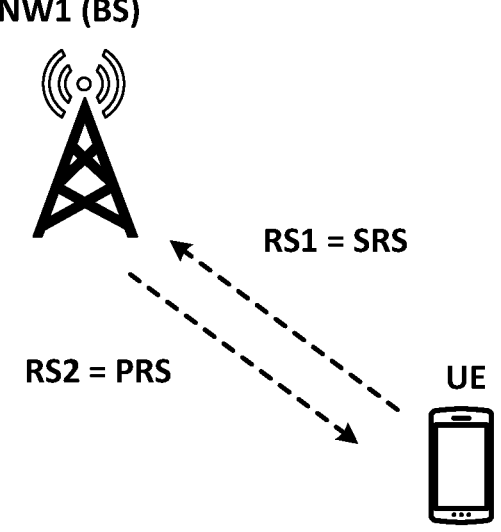
FIG. 6 illustrates examples of a UE and a network node performing time difference measurements.

An example of UE Rx-Tx time difference measurement and gNB Rx-Tx time difference measurement performed based on SRS and PRS by UE and BS, respectively, is shown in FIG. 6, which illustrates Examples of UE and a first network node NW1 (e.g., a BS) performing UE Rx-Tx time difference measurement and gNB Rx-Tx time difference measurement respectively. Both measurements are based on SRS and PRS.

Embodiment #1: Method in UE of Adapting Timing Measurement Procedure Under UE Antenna Switching A first embodiment is related to the first scenario described above. In this scenario, the UE is configured to perform a timing measurement (M1) involving at least RS1 transmitted by the UE. The UE can be configured to perform M1 autonomously or by a network node, such as a base station or a positioning node. The UE is further configured by a network node to transmit RS1 (such as SRS) in cell1. In particular, the UE may be configured to transmit RS1 by receiving RS1 configuration information from the network node, such as via RRC, DCI or MAC signaling. The UE is further configured by a network node to perform RS1 antenna port switching, i.e., switching involving two or more RS1 antenna ports. The UE may obtain information related to RS1 antenna port switching by receiving a configuration from the network node, such as via RRC, DCI or MAC signaling.

While performing the timing measurement M1 or before performing the timing measurement M1, the UE determines that the UE is or will perform one or more RS1 antenna port switching actions. For example, the UE may be configured to perform a number of RS1 antenna port switching during the measurement time (Tm1) of the timing measurement M1. The antenna ports involved in the RS1 antenna port switching may not be perfectly time aligned with respect to each other. For example the magnitude of difference in transmit timings of any two antenna ports may differ by $\Delta T + \delta$, where for example $\delta = TAE \leq 130$ ns. $\Delta T = T1 - T2$ where T1 and T2 are time instances configured for transmitting RS1 (e.g. SRS) by different antenna ports (e.g. Tx1 and Tx2 respectively).

In order to reduce or mitigate timing errors in the timing measurement M1, the UE upon determining that the UE is performing or is going to perform RS1 antenna port switching during the measurement time period Tm1, may adapt the measurement procedure for the timing measurement M1. The adaptation may include one or more of the following procedure or operations.

One example of the adaption includes adapting the number of RS1 antenna port switching actions (N1) during the measurement time period Tm1. For example, the UE may not perform more than N1max number of antenna switching actions during the measurement time period Tm1 e.g. $N1 \leq N1max$. The parameter N1max can be obtained by the UE based on pre-defined information, by receiving it from another node (e.g. a BS, LMF, etc.) or may be autonomously determined by the UE.

The value of N1max may be determined by the UE or another node based on a timing misalignment between antenna ports. For example if $\delta$ is small (e.g. below or equal to certain threshold (H1)) then a larger value of N1max (e.g. N1max above threshold (G1)) may be used. Otherwise if $\delta > H1$ then $N1max \leq G1$. As a special case N1max=0, which means the UE does not perform any RS1 antenna port switching action during the measurement time period Tm1. This may be defined as a rule, which can be pre-defined or configured by another node. For example the rule may state that the UE will not perform RS1 antenna port switching while performing the timing measurement M1.

A specific example of such a rule may state that the UE will not or is not required to perform SRS antenna port switching while performing UE Rx-Tx time difference measurement (or during the UE Rx-Tx time difference measurement period). Another example of the rule may state that the UE will prioritize the timing measurement M1 over the RS1 antenna port switching. A specific example of such rule may state that the UE will prioritize the UE Rx-Tx time difference measurement over the SRS antenna port switching. When not performing SRS1 antenna port switching, the UE may transmit RS1 only from one of the antennas (e.g. reference antenna port (Txr)) configured for antenna switching. For example, Txr may be a specific antenna port that may be pre-defined (e.g. first antenna port, default antenna port) or it may be configured by the network node e.g. by BS.

In another example, upon determining that (N1>N1max) during the measurement time period Tm1, the UE may performing one or more tasks or taking one or more actions. As a special case, N1max=0. Examples of such tasks or actions include discarding, stopping or abandoning the timing measurement M1. That is, the UE may discontinue the measurement once N1 exceeds N1max. This may be expressed as a rule or a requirement, which may be pre-defined or configured by another node (e.g. a BS, LMF, etc.). For example the rule or requirement may provide that if N1>N1max during the measurement time period Tm1, then the UE is not required to meet one or more requirements for the timing measurement M1.

A specific example of such a rule may provide that if N1>N1max during the UE Rx-Tx time difference measurement period, then the UE is not required to meet one or more UE Rx-Tx time difference measurement requirements. Examples of such requirements include measuring within the measurement time, measurement reporting delay (e.g. transmitting results within certain time after the measurement time period Tm1), measurement accuracy (±X1 time units such as ±X1 Tc, where 1 Tc≈0.5 ns) etc.

Further examples of such tasks or actions include discarding ongoing the timing measurement M1 and restarting the timing measurement M1. That is, the UE may discard old measurement samples obtained until N1>N1max, and after that restart the measurement. In this case, the measurement time may be extended e.g. from the measurement time period Tm1 to the measurement time period Tm11, where Tm11>Tm1. In one example, Tm11=(N1+1)*Tm1+N1*μ; where μ=margin to account for restarting the measurement and Tm1 is the basic measurement time for the timing measurement M1.

Further examples of such tasks or actions include discarding, stopping or abandoning the timing measurement M1 if condition (N1>N1max) occurs for more than K1 times in successive measurement periods. That is, the UE may not restart the timing measurement M1. For example it may be pre-defined that if the condition (N1>N1max) is met more than K1 times, then the UE is not required to meet requirement for the timing measurement M1.

In another example, the UE is further configured by another node (e.g. BS, positioning node, etc.) to apply the procedure in the first example or the procedure in the second example above. For example the UE can be configured to continue performing RS1 antenna switching actions during the measurement time period Tm1 or discard the timing measurement M1 if RS1 antenna switching actions are performed during the measurement time period Tm1. The UE will apply the measurement procedure based on the received configuration information.

A specific example of configuration includes indicating whether the UE will continue performing SRS antenna switching actions during the UE Rx-Tx time difference measurement period or the UE will discard UE Rx-Tx time difference measurement results if SRS antenna switching occurs during the UE Rx-Tx time difference measurement period. In another example, the UE may be configured as to whether the UE is allowed to perform up to N1max number of SRS antenna switching actions during the UE Rx-Tx time difference measurement period or the UE will discard UE Rx-Tx time difference measurement results if number of SRS antenna switching actions during the UE Rx-Tx time difference measurement period exceed N1max.

The UE may adapt sampling of RS1 for obtaining the timing measurement M1 during the measurement time period Tm1. In one example, if N1>N1max (as a special case N1max=0), the UE may obtain at least K2 number of measurement samples of RS1 over the measurement time period Tm1 to obtain the timing measurement M1 (e.g. based on average of K2samples).

In another example, if N1>N1max (as a special case, N1max=0), the UE may use only those RS1 samples (e.g. K3) over the measurement time period Tm1 to obtain the timing measurement M1 that are obtained while SRS1 antenna port switching was not performed (e.g. based on average of K3 samples).

In another example, if N1>N1max (as a special case, N1max=0), the UE may obtain RS1 measurement samples only from certain reference antenna port (e.g. Trxr), which may be pre-defined or configured by another node.

The UE may compensate the timing measurement results to account for RS1 antenna port switching during the measurement time period Tm1. The compensation may reduce the timing error (e.g. δ) associated with timing misalignment between antenna ports transmitting RS1 during antenna switching over the measurement time period Tm1.

For example, assume that the UE performs N1 number of RS1 antenna switching actions over the measurement time period Tm1. Further assume that each switch introduces positive error of δ, which is known to the UE. Then the UE will obtain the final measurement result by subtracting N1*δ from the measured value of the timing measurement M1 performed over the measurement time period Tm1 when N1 number of RS1 antenna switching actions were performed. The UE may report results of compensated measurements or results of both compensated and uncompensated measurements to another node e.g. BS, positioning node.

The UE may transmit information about any of the tasks or operations or actions related to the adaptation of the timing measurement M1 described in previous examples, to another node, such as a BS or positioning node. For example, the UE may transmit information about parameters such as N1 N1max, the measurement time period Tm11, K1, K2, K3, indication whether the measurement results include compensation or not, etc.

The UE may inform another node (such as a BS or positioning node) about the UE's intention (or current configuration) or capability to perform RS1 antenna switching in general or specifically for any of: the timing measurement M1, the measurement time period Tm1, the timing measurement M2 described below, or the measurement time period Tm2 described below.

The adaptation may include using a single antenna port for performing the measurement the timing measurement M1 even if the RS1 switching is performed during the measurement time period Tm1. For example, for UE Rx-Tx, the UE may determine the Tx time at every time instance t_i during the measurement time period Tm1 for the same antenna port, even when RS1 is transmitted from another antenna port at that time instance t_i.

The adaptation may include using for the timing measurement M1 only a subset of all time instances t_i configured for RS1 transmissions during the measurement time period Tm1, wherein all time instances t_i are all configured for RS1 transmissions, and the subset includes only time instances t_i when RS1 is transmitted from the same antenna port.

In yet another example, the UE may either not perform antenna switching beyond what is allowed (with N1max=0 as a special case) or may select a subset of time instances for performing measurement the timing measurement M1 to include only the time instances associated with the same RS1 antenna port.

Embodiment #2: Method in First Network Node of Adapting Timing Measurement Procedure Under UE Antenna Port Switching In a second embodiment, a the first network node (NW1) is configured to perform a timing measurement (M2) involving at least RS1 transmitted by the UE in cell1. Examples of NW1 include a base station, LMU etc. NW1 is configured to perform a timing measurement M2 autonomously or in response to a request from another network node, such as a positioning node (e.g., a LMF). The timing measurement M2 may be performed over a measurement time period (Tm2). NW1 obtains information that the UE is performing or is going to perform RS1 antenna port switching during the measurement time period Tm2. In one example NW1 obtains this information by receiving it from another node, such as from the UE, from a positioning node, from another base station, etc. In another example NW1 may configure the UE to perform SRS1 antenna port switching.

While performing the timing measurement M2 or before performing the timing measurement M2, NW1 determines that the UE is performing or is going to perform one or more RS1 antenna port switching actions. For example the UE may be configured to perform a number of RS1 antenna port switching during the measurement time (Tm1) of the timing measurement M1.

The antenna ports involved in the RS1 antenna port switching may not be perfectly time aligned with respect to each other. For example the magnitude of difference in transmit timings of any two antenna ports may differ by $\Delta T+\delta$, where for example $\delta=TAE\leq130$ ns. $\Delta T=T1-T2$ where T1 and T2 are time instances configured for transmitting RS1 (e.g. SRS) by different antenna ports (e.g. Tx1 and Tx2 respectively). As described in the first embodiment, the RS1 antenna port switching may introduce a timing error (e.g. $\delta$ due to TAE between UE Tx antennas) in the timing measurement results. Therefore, the timing measurement M2 may also incorporate the timing error due to the RS1 antenna port switching during the measurement time period Tm1.

Upon determining that the UE is performing or is going to perform RS1 antenna port switching during the measurement time period Tm2, NW1 may adapt the timing measurement M2 measurement procedure to reduce timing errors in the timing measurement M2. The adaptation of the measurement procedure may include one or more of the following actions or operations or tasks:

If the number of RS1 antenna port switching actions (N2) during the measurement time period Tm2 exceeds a predetermined threshold (N2max), then NW1 may perform one or more tasks. As a special case N2max=0. Examples of tasks include discarding, stopping or abandoning the timing measurement M2, discarding the timing measurement M2 and restarting the timing measurement M2. For example, the network node NW1 may discard samples obtained until N2>N2max and obtain new samples to complete the timing measurement M2. In this case, the measurement time may be extended, for example, from the measurement time period Tm3 to the measurement time period Tm21, where Tm21>Tm2.

In one example, the measurement time period Tm21= (N2+1)*Tm2+N2*β; where β is a margin to account for restarting the measurement and the measurement time period Tm2 is the basic measurement time for the timing measurement M2.

In another example, NW1 may request that the UE not perform a number of RS1 antenna port switching actions by more than N2max during the measurement time period Tm2.

In another example, NW1 may adapt the measurement sampling involving RS1 samples for obtaining the timing measurement M2 during the measurement time period Tm2.

In one example, if N2>N2max (as a special case N2max=0), then NW1 may obtain at least L1 number of samples of RS1 over the measurement time period Tm2 to obtain or derive the timing measurement M2 (e.g. based on average of L1 samples).

In another example, if N2>N2max (as a special case N2max=0), then NW1 may use only those RS1 samples (e.g. L2) over the measurement time period Tm2 to obtain the timing measurement M2 that are obtained while SRS1 antenna port switching was not performed by the UE e.g. based on average of L2 samples).

In another example, if N2>N2max (as a special case N2max=0), NW1 may obtain RS1 measurement samples (e.g. RS1 received at NW1) of RS1 transmitted by the UE from a certain reference antenna port (e.g. Trxr), which may be pre-defined or configured by another node.

In another example, NW1 may compensate the timing measurement results for the timing measurement M2 to account for RS1 antenna port switching during the measurement time period Tm2. The compensation may reduce the timing error (e.g. $\delta$) associated with timing misalignment between antenna ports transmitting RS1 during antenna switching over the measurement time period Tm2.

For example, assume that the UE performs N2 number of RS1 antenna switching actions over the measurement time period Tm2. Further assume that each switch introduces a positive error of $\delta$, which is known to NW1 e.g. as predefined requirement or informed by the UE. NW1 then obtains the final measurement result by subtracting N2*$\delta$ from the measured value of the timing measurement M2 performed over the measurement time period Tm2 during which N2 number of RS1 antenna switching actions were performed. NW1 may report results of compensated measurements or results of both compensated and uncompensated measurements to another node e.g. another BS, positioning node.

In another example, NW1 may transmit information about any of the tasks or operations or actions related to the adaptation of the timing measurement M2 described in previous examples, to another node, such as another BS, positioning node. For example, NW1 may include information about parameters such as N2, N2max, the measurement time period Tm21, L1, L2, an indication whether the measurement results include compensation or not, etc.

NW1 may apply an adaptation upon determining (e.g., based on UE indication or positioning node indication or UE's serving BS indication) that the UE is using RS1 antenna port switching or is capable of doing this, and may not apply the adaptation otherwise.

Embodiment #3: Method in Second Network Node of Receiving and Using Timing Measurement Performed Under UE Antenna Port Switching According a third embodiment, a second network node (NW2) (e.g., a positioning node) obtains a measurement result of a timing measurement (M3) performed by a node (UE or NW1) over the measurement time period Tm3 or the measurement time period Tm31. The timing measurement M3 is performed on at least RS1 transmitted by the UE over the measurement time when the UE is configured to perform RS1 antenna port switching. In one example, the timing measurement M3, the measurement time period Tm3 and the measurement time period Tm31 including the timing measurement M1, the measurement time period Tm1 and the measurement time period Tm11 as described in the first embodiment i.e. timing measurement performed by the UE.

In another example, NW2 may further obtain information about RS1 antenna port switching performed by the UE during a timing measurement period T3. NW2 may further obtain information about adaptation of the measurement procedure for a timing measurement M3 by the node (e.g. the UE or NW1) to account for RS1 antenna port switching actions during the timing measurement period T3. In one example, when the timing measurement M3 is the timing measurement M1, the information about adaptation of the measurement procedure for the timing measurement M3 may include any of the examples of adaptation described in connection with the first embodiment above (i.e., for the timing measurement M1). In another example, when the timing measurement M3 is the timing measurement M2, the information about adaptation of the measurement procedure for the timing measurement M3 may include any of the examples of adaptation described in the second embodiment (i.e. for the timing measurement M2). NW2 may obtain this information by receiving it from another node, such as the UE, NW1, another network node, etc.

NW2 may use the above obtained information (e.g. the timing measurement M3 results, adaptation of the timing measurement M3, etc.) for performing one or more procedures or tasks or operations. Examples of such procedures include:

1. Discarding the measurement results;
2. Adapting or modifying the measurement results, e.g., applying compensation by removing timing error due to RS1 antenna switching, etc.;
3. Requesting the node (e.g. UE and/or NW1) not to perform the measurement if number of RS1 antenna switching (N3) exceeds certain threshold (N3max) during the measurement time period Tm3, where N3max=0 as a special case; and
4. Adapting the assistance data sent to the node etc. For example NW2 may increase the bandwidth of RS1 by certain margin (BWr) compared to previous value over which the measurement is to be performed by the node. This may increase the timing measurement accuracy.

Figure 7:
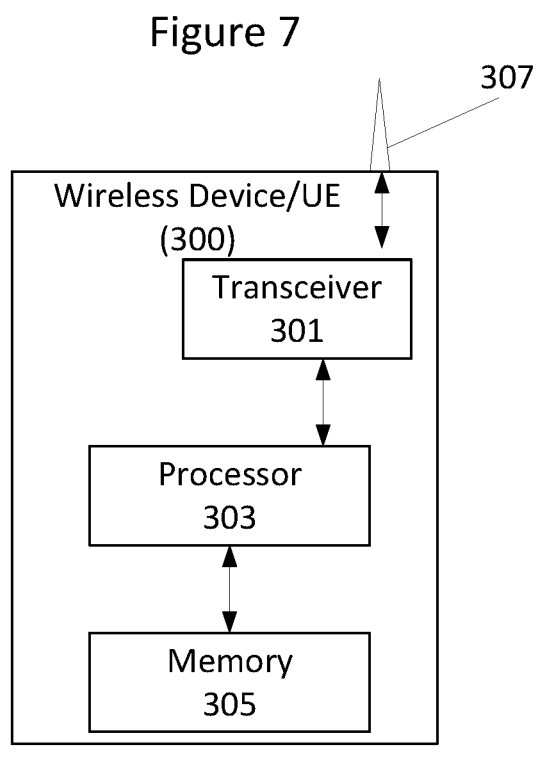
FIG. 7 is a block diagram illustrating a wireless device (UE) according to some embodiments of inventive concepts.

FIG. 7 is a block diagram illustrating elements of a communication device UE 300 (also referred to as a mobile terminal, a mobile communication terminal, a wireless device, a wireless communication device, a wireless terminal, mobile device, a wireless communication terminal, user equipment, UE, a user equipment node/terminal/device, etc.) configured to provide wireless communication according to embodiments of inventive concepts. The UE 300 shown in FIG. 7 may correspond to a remote UE and/or a UE-to-Network Relay as described above. (Communication device 300 may be provided, for example, as discussed below with respect to wireless device 4110 of FIG. 13, UE 4200 of FIG. 14, UEs 4491, 4492 of FIG. 16, and/or UE 4530 of FIG. 17.)

Figure 13:
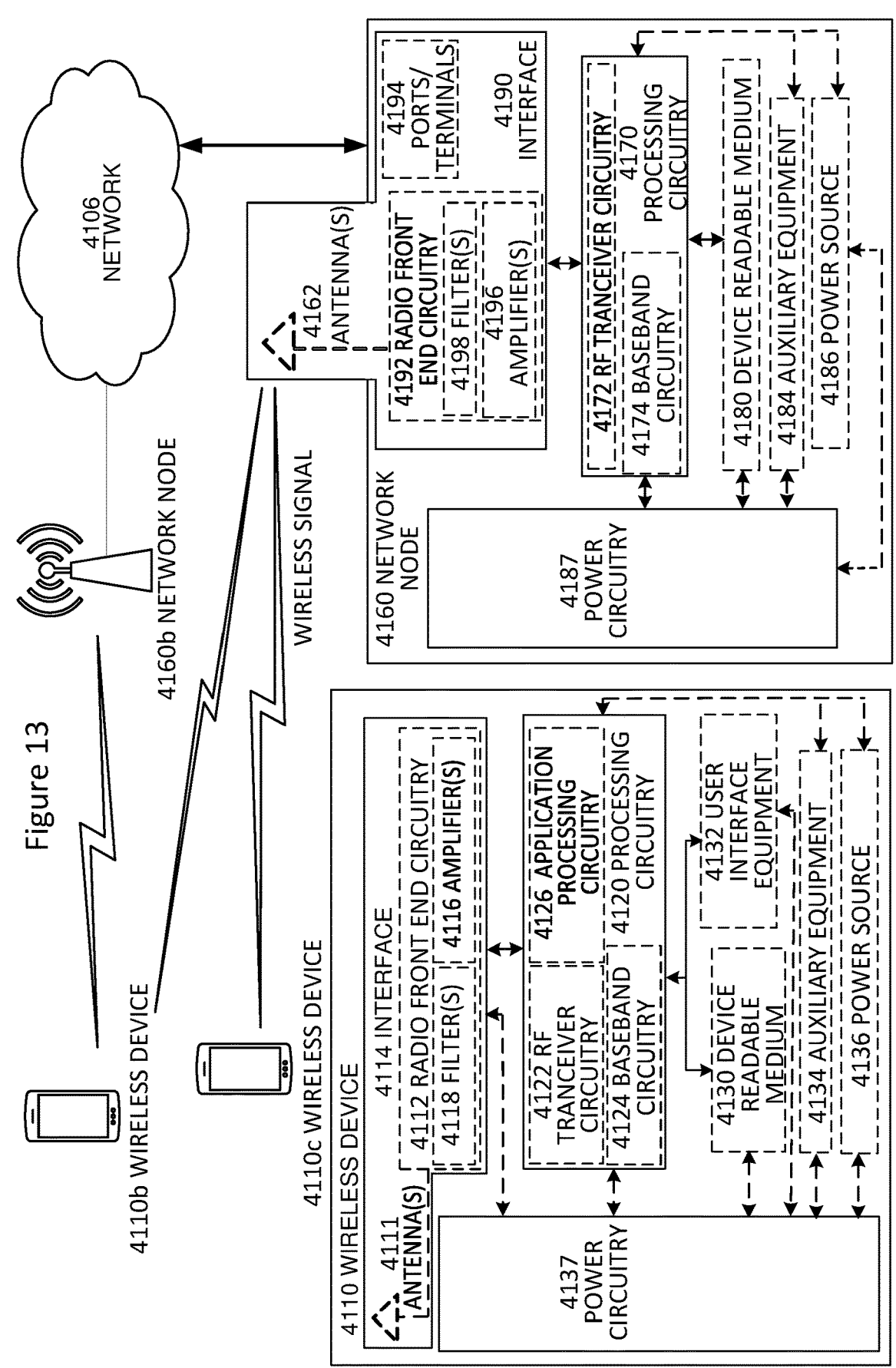
FIG. 13 is a block diagram of a wireless network in accordance with some embodiments.

As shown, communication device UE may include an antenna 307 (e.g., corresponding to antenna 4111 of FIG. 13), and transceiver circuitry 301 (also referred to as a transceiver, e.g., corresponding to interface 4114 of FIG. 13) including a transmitter and a receiver configured to provide uplink and downlink radio communications with a base station(s) (e.g., corresponding to network node 4160 of FIG. 13, also referred to as a RAN node) of a radio access network. Communication device UE may also include processing circuitry 303 (also referred to as a processor, e.g., corresponding to processing circuitry 4120 of FIG. 13) coupled to the transceiver circuitry, and memory circuitry 305 (also referred to as memory, e.g., corresponding to device readable medium 4130 of FIG. 13) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Communication device UE may also include an interface (such as a user interface) coupled with processing circuitry 303, and/or communication device UE may be incorporated in a vehicle.

As discussed herein, operations of communication device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless communication devices). According to some embodiments, a communication device UE 300 and/or an element(s)/function(s) thereof may be embodied as a virtual node/nodes and/or a virtual machine/machines.

Figure 8:
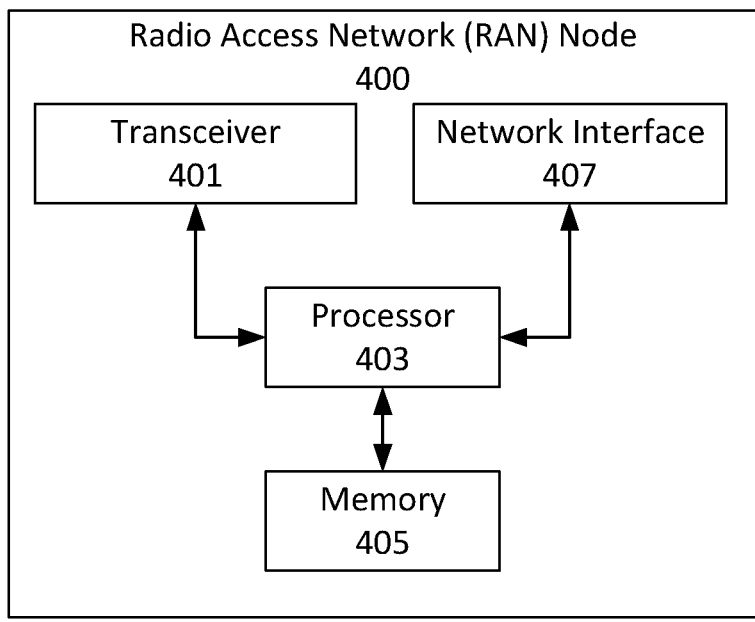
FIG. 8 is a block diagram illustrating a radio access network RAN node (e.g., a base station eNB/gNB) according to some embodiments of inventive concepts.

FIG. 8 is a block diagram illustrating elements of a radio access network RAN node 400 (also referred to as a network node, base station, eNodeB/eNB, gNodeB/gNB, etc.) of a Radio Access Network (RAN) configured to provide cellular communication according to embodiments of inventive concepts. (RAN node 400 may be provided, for example, as discussed below with respect to network node 4160 of FIG. 13, base stations 4412a, 4412b, 4412c of FIG. 16, and/or base station 4520 of FIG. 17.) As shown, the RAN node may include transceiver circuitry 401 (also referred to as a transceiver, e.g., corresponding to portions of interface 4190 of FIG. 13) including a transmitter and a receiver configured to provide uplink and downlink radio communications with mobile terminals. The RAN node may include network interface circuitry 407 (also referred to as a network interface, e.g., corresponding to portions of interface 4190 of FIG. 13) configured to provide communications with other nodes (e.g., with other base stations) of the RAN and/or core network CN. The network node may also include processing circuitry 403 (also referred to as a processor, e.g., corresponding to processing circuitry 4170) coupled to the transceiver circuitry, and memory circuitry 405 (also referred to as memory, e.g., corresponding to device readable medium 4180 of FIG. 13) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments relating to RAN nodes). According to some embodiments, RAN node 400 and/or an element(s)/function(s) thereof may be embodied as a virtual node/nodes and/or a virtual machine/machines.

According to some other embodiments, a network node may be implemented as a core network CN node without a transceiver. In such embodiments, transmission to a wireless communication device UE may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Figure 9:
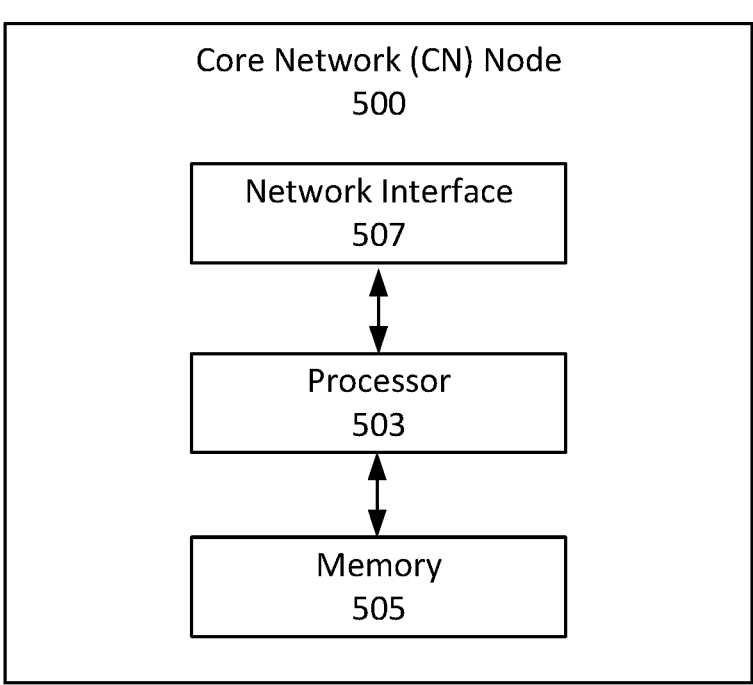
FIG. 9 is a block diagram illustrating a core network CN node (e.g., an AMF node, an SMF node, etc.) according to some embodiments of inventive concepts.

FIG. 9 is a block diagram illustrating elements of a core network CN node (e.g., an SMF node, an AMF node, etc.) of a communication network configured to provide cellular communication according to embodiments of inventive concepts. As shown, the CN node may include network interface circuitry 507 (also referred to as a network interface) configured to provide communications with other nodes of the core network and/or the radio access network RAN. The CN node may also include a processing circuitry 503 (also referred to as a processor) coupled to the network interface circuitry, and memory circuitry 505 (also referred to as memory) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the CN node may be performed by processing circuitry 503 and/or network interface circuitry 507. For example, processing circuitry 503 may control network interface circuitry 507 to transmit communications through network interface circuitry 507 to one or more other network nodes and/or to receive communications through network interface circuitry from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments relating to core network nodes). According to some embodiments, CN node 500 and/or an element(s)/function(s) thereof may be embodied as a virtual node/nodes and/or a virtual machine/machines.

Operations of a user equipment UE 300 (implemented using the structure of FIG. 7) will now be discussed with reference to the flow chart of FIG. 10 according to some embodiments of inventive concepts. For example, modules may be stored in memory 305 of FIG. 7, and these modules may provide instructions so that when the instructions of a module are executed by respective UE processing circuitry 303, processing circuitry 303 performs respective operations of the flow chart.

Referring to FIG. 10, some embodiments provide a method of operating a wireless device that is configured to perform a timing measurement procedure that involves transmission of a reference signal during a timing measurement period. The method includes determining (1002) that the wireless device is configured for antenna port switching of an antenna port configuration for transmitting the reference signal during the timing measurement period, and in response to determining that the wireless device is configured for antenna port switching of the antenna port configuration for transmitting the reference signal during the timing measurement period, adapting (1004) at least one of: the timing measurement procedure during the timing measurement period and a configuration for antenna port switching of the antenna port configuration for transmitting the reference signal during the timing measurement period.

The wireless device may be configured to switch from a first antenna port configuration for transmitting the reference signal to a second antenna port configuration for transmitting the reference signal during the timing measurement period.

Adapting the configuration for antenna port switching may include limiting a number of antenna port switching actions during the timing measurement period.

Limiting the number of antenna port switching actions during the timing measurement period may include limiting the number of antenna port switching actions during the timing measurement period to less than a maximum number of port switching actions.

The maximum number of port switching actions may be one.

The maximum number of port switching actions may be provided by a network node, may be predefined, or may be autonomously determined by the wireless device.

Adapting the configuration for antenna port switching may include not performing antenna port switching during the timing measurement period.

Adapting the timing measurement procedure during the timing measurement period may include discarding, stopping or abandoning the timing measurement procedure in response to a number of antenna switching actions exceeding a threshold number of antenna switching actions.

The threshold number of antenna switching actions may be zero or may be greater than zero.

Adapting the timing measurement procedure during the timing measurement period may include relaxing a measurement requirement for the timing measurement during the timing measurement period.

The measurement requirement may include at least one of: a measurement time limit, a measurement reporting delay and a measurement accuracy.

Adapting the timing measurement procedure during the timing measurement period may include restarting the timing measurement procedure.

The method may further include discarding previous timing measurements upon restarting the timing measurement procedure.

Adapting the timing measurement procedure during the timing measurement period may include compensating timing measurements based on the antenna port switching.

Adapting the timing measurement procedure during the timing measurement period may include performing timing measurements during the timing measurement period only based on reference signals transmitted using a single antenna port configuration.

The method may further include transmitting information about the adaptation of the configuration for antenna port switching to a network node.

The method may further include transmitting information about the adaptation of the timing measurement procedure to a network node.

Referring to FIGS. 7 and 10, a wireless device (300) according to some embodiments includes processing circuitry (303), and memory (305) coupled with the processing circuitry. The memory includes instructions that when executed by the processing circuitry causes the wireless device to perform operations of determining (1002) that a wireless device is configured for antenna port switching of an antenna port configuration for transmitting a reference signal during a timing measurement period, and in response to determining that the wireless device is configured for antenna port switching of the antenna port configuration for transmitting the reference signal during the timing measurement period, adapting (1004) at least one of: the timing measurement procedure during the timing measurement period and a configuration for antenna port switching of the antenna port configuration for transmitting the reference signal during the timing measurement period.

Referring to FIGS. 7 and 10, a wireless device (300) according to some embodiments is adapted to perform operations of determining (1002) that a wireless device is configured for antenna port switching of an antenna port configuration for transmitting a reference signal during a timing measurement period, and in response to determining that the wireless device is configured for antenna port switching of the antenna port configuration for transmitting the reference signal during the timing measurement period, adapting (1004) at least one of: the timing measurement procedure during the timing measurement period and a configuration for antenna port switching of the antenna port configuration for transmitting the reference signal during the timing measurement period.

Referring to FIGS. 7 and 10, some embodiments provide a computer program including program code to be executed by processing circuitry (303) of a wireless device (300), whereby execution of the program code causes the wireless device (300) to perform operations of determining (1002) that a wireless device is configured for antenna port switching of an antenna port configuration for transmitting a reference signal during a timing measurement period, and in response to determining that the wireless device is configured for antenna port switching of the antenna port configuration for transmitting the reference signal during the timing measurement period, adapting (1004) at least one of: the timing measurement procedure during the timing measurement period and a configuration for antenna port switching of the antenna port configuration for transmitting the reference signal during the timing measurement period.

Referring to FIGS. 7 and 10, some embodiments provide a computer program product including a non-transitory storage medium including program code to be executed by processing circuitry (303) of a wireless device (300), whereby execution of the program code causes the wireless device (300) to perform operations of determining (1002) that a wireless device is configured for antenna port switching of an antenna port configuration for transmitting a reference signal during a timing measurement period, and in response to determining that the wireless device is configured for antenna port switching of the antenna port configuration for transmitting the reference signal during the timing measurement period, adapting (1004) at least one of: the timing measurement procedure during the timing measurement period and a configuration for antenna port switching of the antenna port configuration for transmitting the reference signal during the timing measurement period.

Operations of a network node 400 (implemented using the structure of FIG. 8) will now be discussed with reference to the flow chart of FIG. 11 according to some embodiments of inventive concepts. For example, modules may be stored in memory 405 of FIG. 8, and these modules may provide instructions so that when the instructions of a module are executed by respective processing circuitry 403, processing circuitry 403 performs respective operations of the flow chart.

Figure 11:
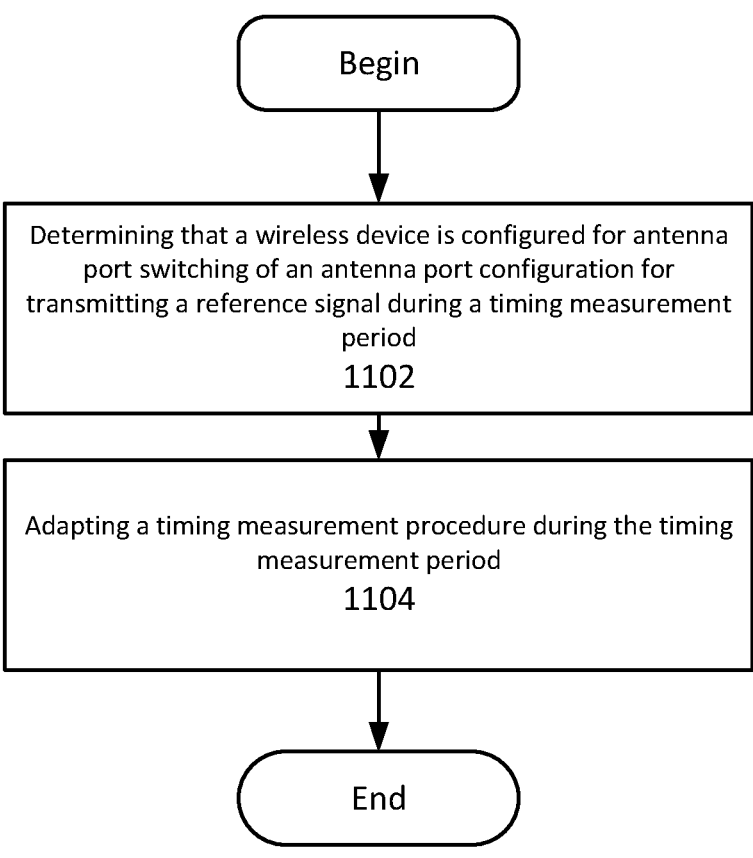

Referring to FIG. 11, some embodiments provide a method of operating a network node that serves a wireless device that is configured to transmit a reference signal during a timing measurement period. The method includes determining (1102) that the wireless device is configured for antenna port switching of an antenna port configuration for transmitting the reference signal during the timing measurement period, and adapting (1104) a timing measurement procedure during the timing measurement period in response to determining that the wireless device is configured for antenna port switching of the antenna port configuration for transmitting the reference signal during the timing measurement period.

The method may further include transmitting information about the adaptation of the timing measurement procedure to another network node.

Adapting the timing measurement procedure may include requesting the wireless device not to perform antenna port switching during the timing measurement period.

The method may further include determining that the wireless device has performed a number of antenna port switching actions during the timing measurement period that may be greater than a threshold number of antenna port switching actions, and in response to determining that the wireless device has performed the number of antenna port switching actions during the timing measurement period that may be greater than the threshold number of antenna port switching actions, stopping the timing measurement procedure.

The method may further include discarding timing measurement samples made during the timing measurement period.

The method may further include restarting the timing measurement procedure after stopping the timing measurement procedure.

Adapting the timing measurement procedure may include performing a timing measurement calculation for the timing measurement procedure based on a restricted set of samples made during the timing measurement period.

The restricted set of samples may include a set of samples obtained while the wireless device was not performing antenna port switching.

The restricted set of samples may include a set of samples obtained based on transmissions of the reference signal from a single port.

Adapting the timing measurement procedure may include performing a statistical calculation on samples obtained while the wireless device was performing antenna port switching. The statistical calculation may include an average.

Adapting the timing measurement procedure may include extending the timing measurement period.

Adapting the timing measurement procedure may include compensating a timing measurement taken during the timing measurement period.

Compensating the timing measurement may include determining an estimated timing error, $\delta$, introduced by antenna port switching, and compensating the timing measurement based on the estimated timing error $\delta$. Compensating the timing measurement may include multiplying the estimated timing error $\delta$ by a number of antenna port switching actions, N, made during the timing measurement period and adjusting an aggregate timing measurement made during the timing measurement period by an amount equal to $N\delta$.

Referring to FIGS. 8 and 11, a network node (400) according to some embodiments includes processing circuitry (403), and memory (405) coupled with the processing circuitry. The memory includes instructions that when executed by the processing circuitry causes the network node to perform operations of determining (1102) that a wireless device is configured for antenna port switching of an antenna port configuration for transmitting a reference signal during a timing measurement period, and adapting (1104) a timing measurement procedure during the timing measurement period in response to determining that the wireless device is configured for antenna port switching of the antenna port configuration for transmitting the reference signal during the timing measurement period.

Referring to FIGS. 8 and 11, a network node (400) according to some embodiments is adapted to perform operations of determining (1102) that a wireless device is configured for antenna port switching of an antenna port configuration for transmitting a reference signal during a timing measurement period, and adapting (1104) a timing measurement procedure during the timing measurement period in response to determining that the wireless device is configured for antenna port switching of the antenna port configuration for transmitting the reference signal during the timing measurement period.

Referring to FIGS. 8 and 11, some embodiments provide a computer program including program code to be executed by processing circuitry (403) of a network node (400), whereby execution of the program code causes the network node (400) to perform operations of determining (1102) that a wireless device is configured for antenna port switching of an antenna port configuration for transmitting a reference signal during a timing measurement period, and adapting (1104) a timing measurement procedure during the timing measurement period in response to determining that the wireless device is configured for antenna port switching of the antenna port configuration for transmitting the reference signal during the timing measurement period.

Referring to FIGS. 8 and 11, some embodiments provide a computer program product including a non-transitory storage medium including program code to be executed by processing circuitry (403) of a network node (400), whereby execution of the program code causes the network node (400) to perform operations of determining (1102) that a wireless device is configured for antenna port switching of an antenna port configuration for transmitting a reference signal during a timing measurement period, and adapting (1104) a timing measurement procedure during the timing measurement period in response to determining that the wireless device is configured for antenna port switching of the antenna port configuration for transmitting the reference signal during the timing measurement period.

Operations of a network node 400 (implemented using the structure of FIG. 8, or corresponding structure of FIG. 9 in the case of a core network node) will now be discussed with reference to the flow chart of FIG. 12 according to some embodiments of inventive concepts. For example, modules may be stored in memory 405 of FIG. 8, and these modules may provide instructions so that when the instructions of a module are executed by respective processing circuitry 403, processing circuitry 403 performs respective operations of the flow chart.

Referring to FIG. 12, a method of operating a network node according to some embodiments includes receiving (1202) a measurement result of a timing measurement by a remote node involving a reference signal transmitted by a wireless device, wherein the timing measurement was made during a timing measurement period, determining (1204) that the wireless device was configured for antenna port switching of an antenna port configuration for transmitting the reference signal during the timing measurement period, and using (1206) the measurement result of the timing measurement for performing one or more operations.

Performing one or more operations may include adapting a timing measurement procedure that uses the timing measurement result in response to determining that the wireless device was configured for antenna port switching of the antenna port configuration for transmitting the reference signal during the timing measurement period. In some embodiments, performing one or more operations may include using the timing measurement results for determining the position of the wireless device The network node may include a positioning node in a wireless communication network.

The remote node may include the wireless device or a second network node.

The method may further include adapting a timing measurement procedure by the remote node.

Adapting the timing measurement procedure by the remote node may include instructing the remote node to increase a bandwidth of the reference signal.

Adapting the timing measurement procedure by the remote node may include requesting the remote node not to perform the timing measurement if the number of antenna port switching actions performed by the wireless device during the timing measurement period exceeds a threshold number of antenna port switching actions.

The method may further include requesting the wireless device to extend the timing measurement period.

Adapting the timing measurement procedure may include compensating a timing measurement taken during the timing measurement period.

Compensating the timing measurement may include determining an estimated timing error, δ, introduced by antenna port switching, and compensating the timing measurement based on the estimated timing error δ.

Referring to FIGS. 8 and 12, a network node (400) according to some embodiments includes processing circuitry (403), and memory (405) coupled with the processing circuitry. The memory includes instructions that when executed by the processing circuitry causes the network node to perform operations of receiving (1202) a measurement result of a timing measurement by a remote node involving a reference signal transmitted by a wireless device, wherein the timing measurement was made during a timing measurement period, determining (1204) that the wireless device was configured for antenna port switching of an antenna port configuration for transmitting the reference signal during the timing measurement period, and using (1206) the measurement result of the timing measurement for performing one or more operations.

Referring to FIGS. 8 and 12, a network node (400) according to some embodiments is adapted to perform operations of receiving (1202) a measurement result of a timing measurement by a remote node involving a reference signal transmitted by a wireless device, wherein the timing measurement was made during a timing measurement period, determining (1204) that the wireless device was configured for antenna port switching of an antenna port configuration for transmitting the reference signal during the timing measurement period, and using (1206) the measurement result of the timing measurement for performing one or more operations.

Referring to FIGS. 8 and 12, some embodiments provide a computer program including program code to be executed by processing circuitry (403) of a network node (400), whereby execution of the program code causes the network node (400) to perform operations of receiving (1202) a measurement result of a timing measurement by a remote node involving a reference signal transmitted by a wireless device, wherein the timing measurement was made during a timing measurement period, determining (1204) that the wireless device was configured for antenna port switching of an antenna port configuration for transmitting the reference signal during the timing measurement period, and using (1206) the measurement result of the timing measurement for performing one or more operations.

Referring to FIGS. 8 and 12, some embodiments provide a computer program product including a non-transitory storage medium including program code to be executed by processing circuitry (403) of a network node (400), whereby execution of the program code causes the network node (400) to perform operations of receiving (1202) a measurement result of a timing measurement by a remote node involving a reference signal transmitted by a wireless device, wherein the timing measurement was made during a timing measurement period, determining (1204) that the wireless device was configured for antenna port switching of an antenna port configuration for transmitting the reference signal during the timing measurement period, and using (1206) the measurement result of the timing measurement for performing one or more operations.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. 13 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHZ and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 13 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136.

Power circuitry 4137 may perform any formatting, converting, or other modification to the power from power source 4136 to make the power suitable for the respective components of WD 4110 to which power is supplied.

Figure 14:
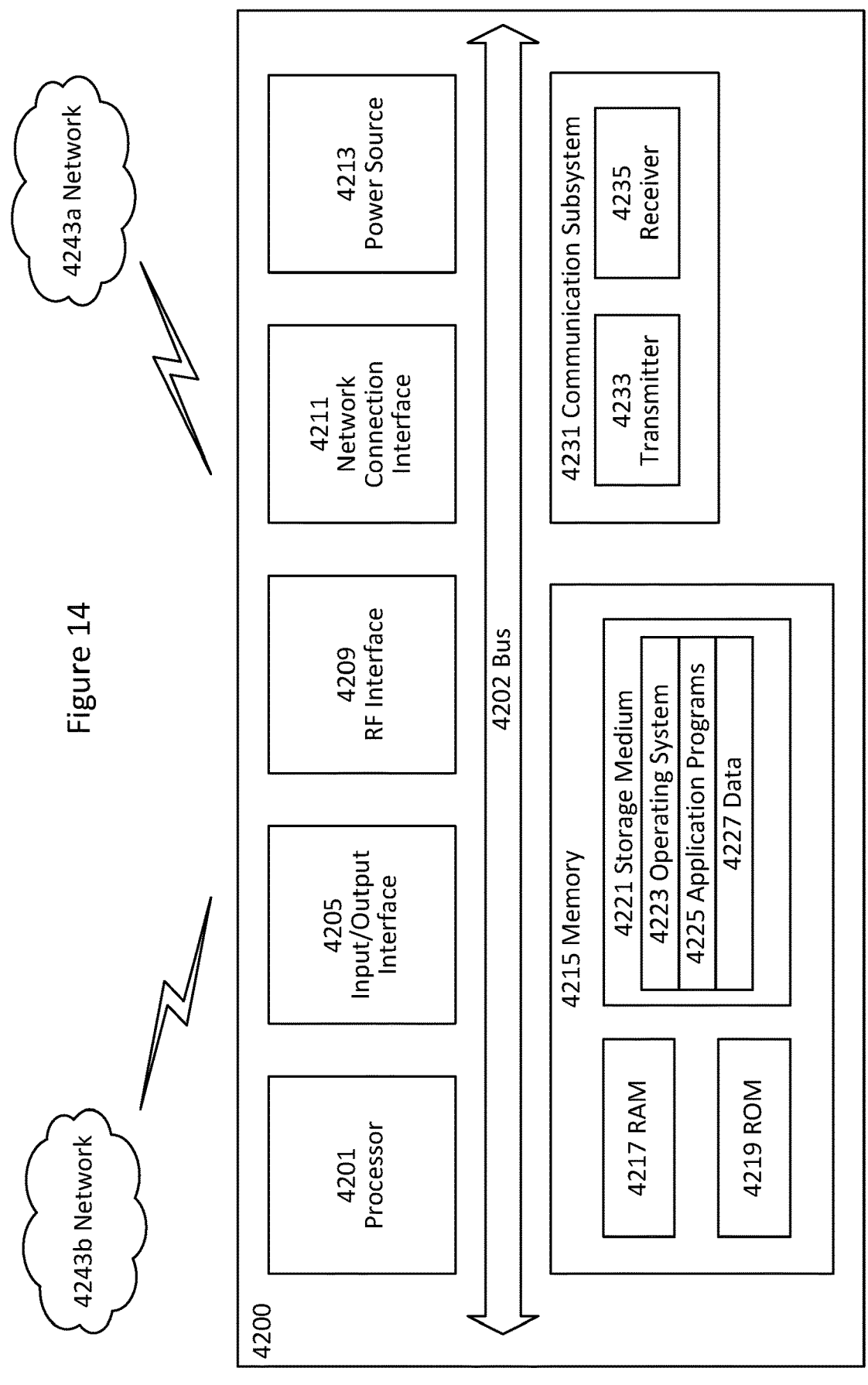
FIG. 14 is a block diagram of a user equipment in accordance with some embodiments

FIG. 14 illustrates a user Equipment in accordance with some embodiments.

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 14, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 14, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 15:
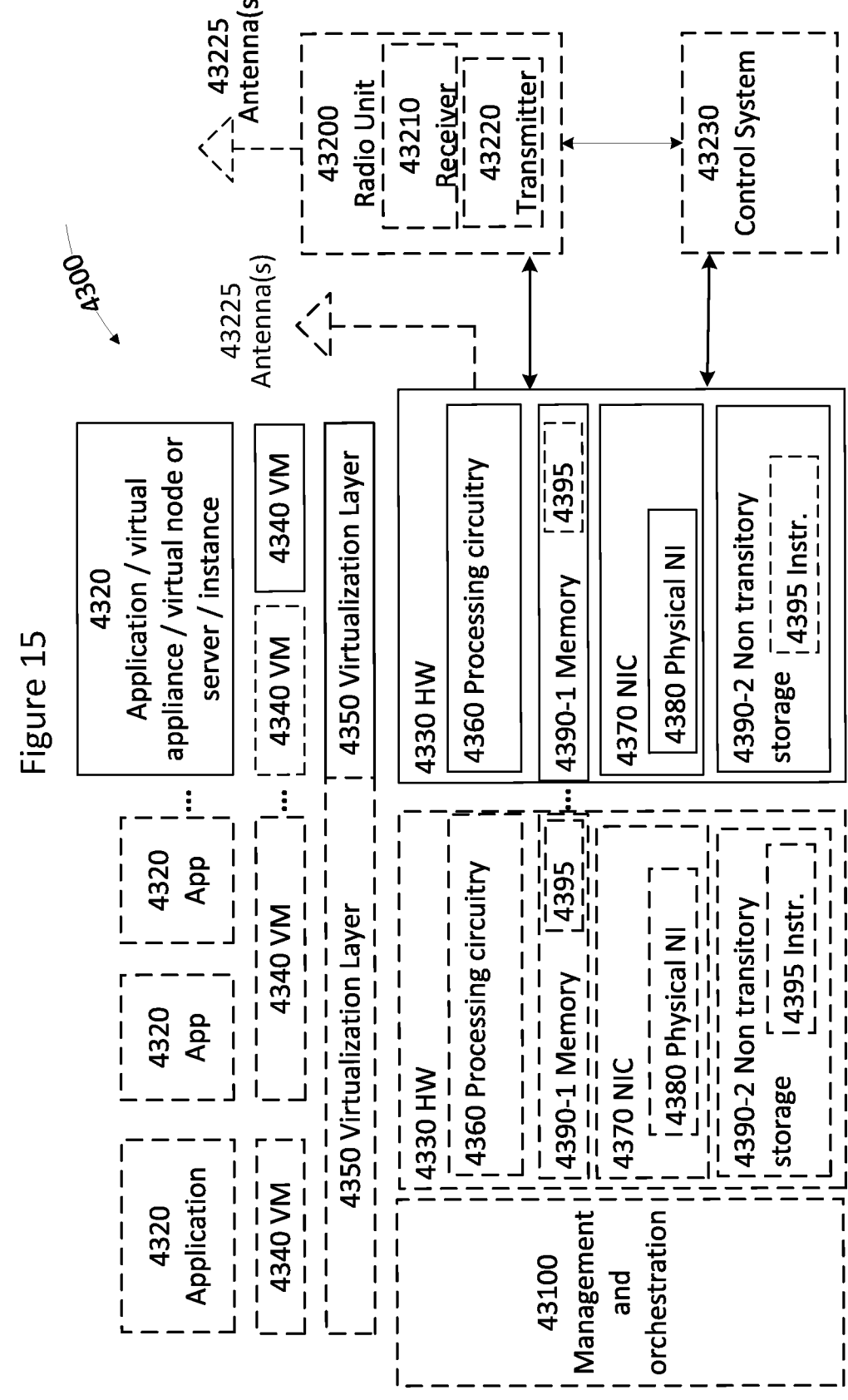
FIG. 15 is a block diagram of a virtualization environment in accordance with some embodiments.

FIG. 15 illustrates a virtualization environment in accordance with some embodiments.

FIG. 15 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 15, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 15.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 16:
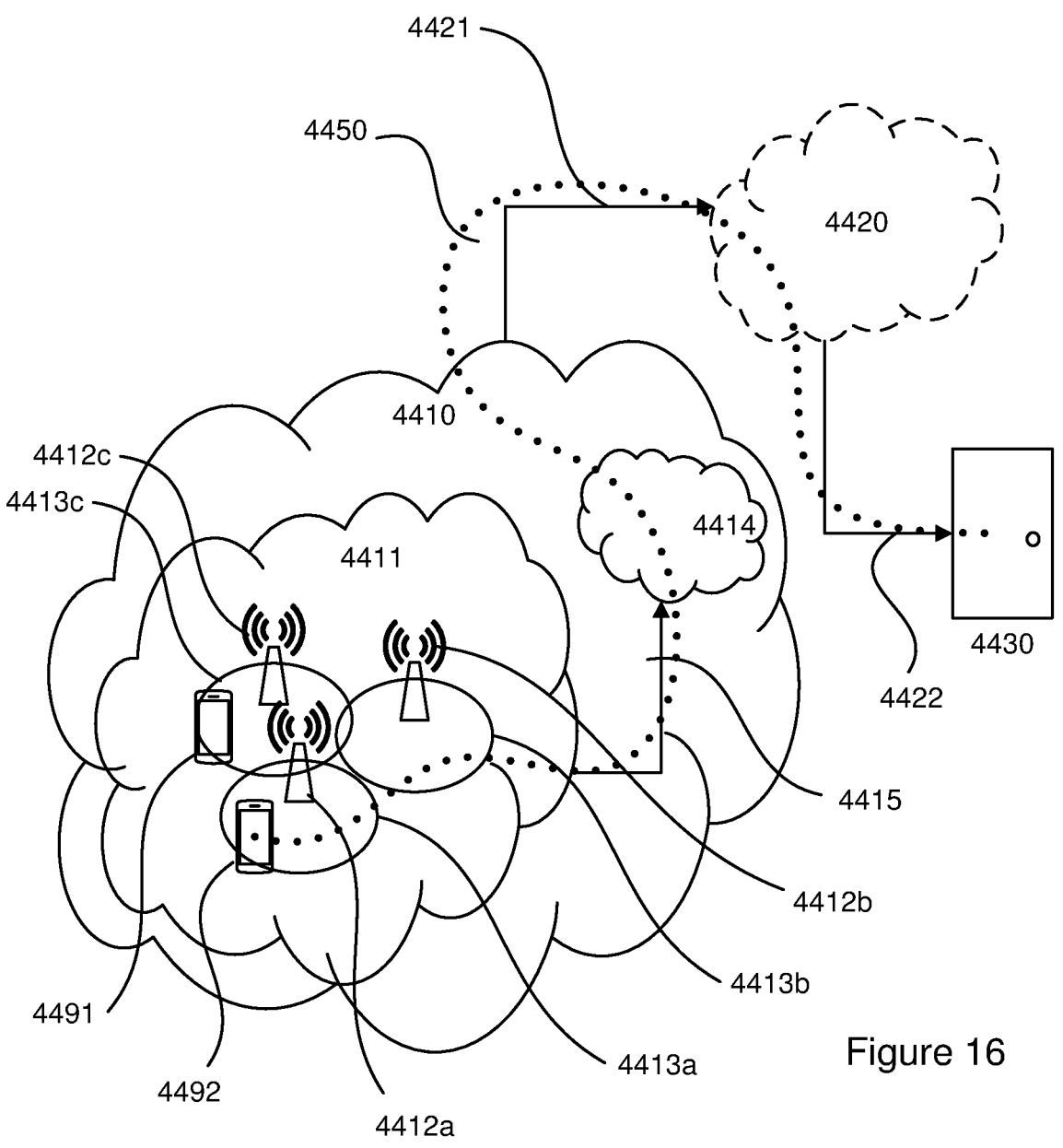
FIG. 16 is a block diagram of a telecommunication network connected via an intermediate network to a host computer in accordance with some embodiments.

FIG. 16 illustrates a telecommunication network connected via an intermediate network to a host computer in accordance with some embodiments.

With reference to FIG. 16, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 16 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 17:
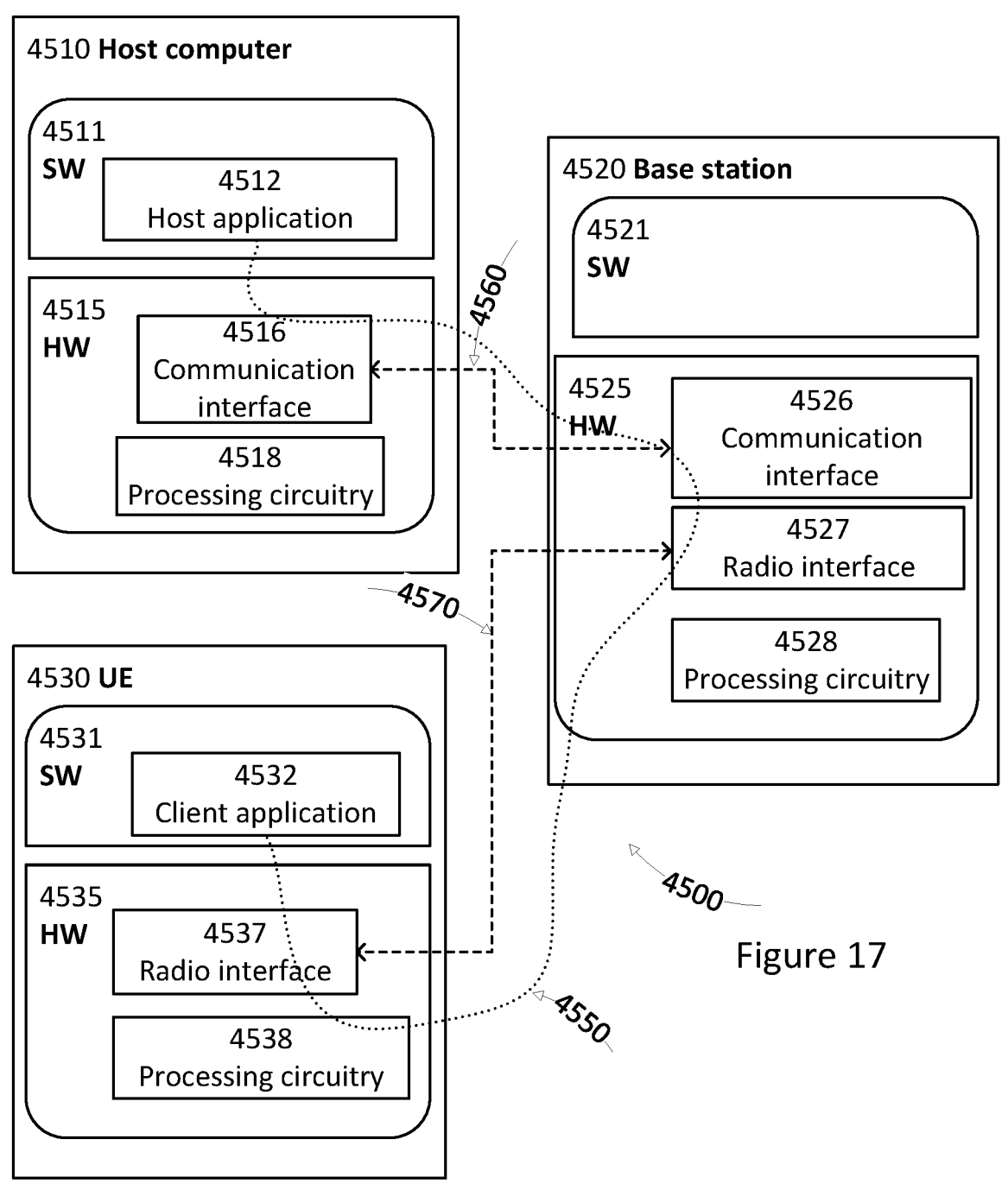
FIG. 17 is a block diagram of a host computer communicating via a base station with a user equipment over a partially wireless connection in accordance with some embodiments.

FIG. 17 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 17. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 17) served by base station 4520. Communication interface 4526 may be configured to facilitate connection 4560 to host computer 4510. Connection 4560 may be direct or it may pass through a core network (not shown in FIG. 17) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 17 may be similar or identical to host computer 4430, one of base stations 4412a, 4412b, 4412c and one of UEs 4491, 4492 of FIG. 16, respectively. This is to say, the inner workings of these entities may be as shown in FIG. 17 and independently, the surrounding network topology may be that of FIG. 16.

In FIG. 17, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 18:
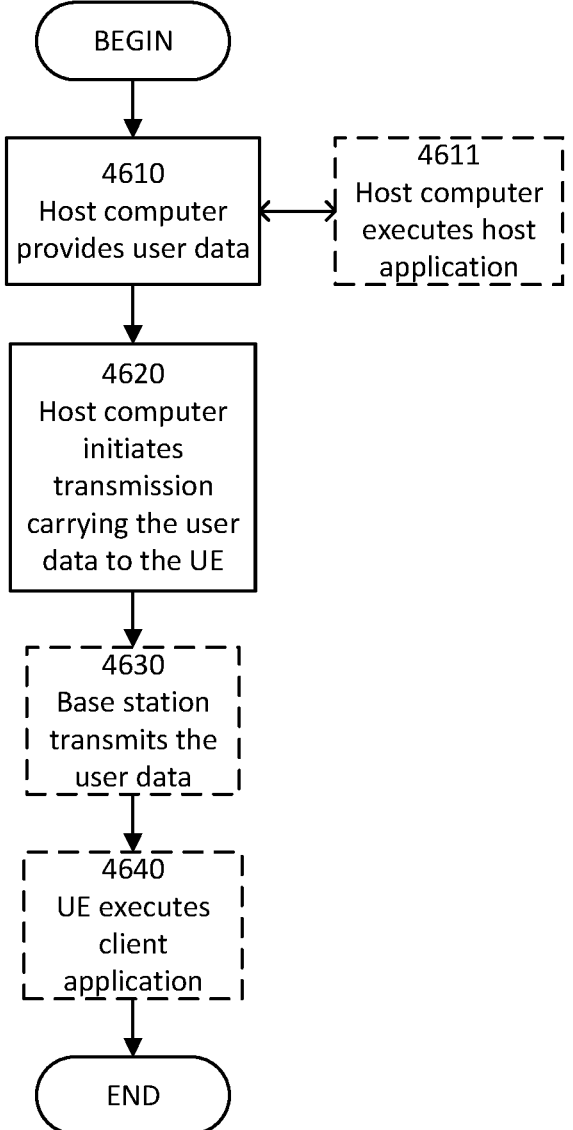
FIG. 18 is a block diagram of methods implemented in a communication system including a host computer, a base station and a user equipment in accordance with some embodiments.

FIG. 18 illustrates methods implemented in a communication system including a host computer, a base station and a user equipment in accordance with some embodiments. FIG. 18 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 18 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 19:
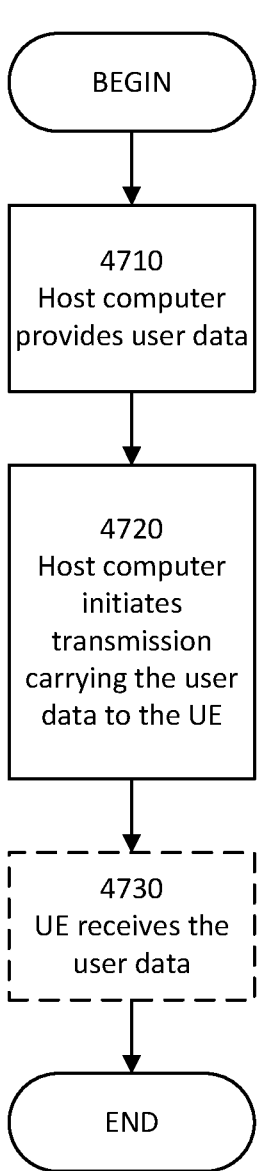
FIG. 19 is a block diagram of methods implemented in a communication system including a host computer, a base station and a user equipment in accordance with some embodiments.

FIG. 19 illustrates methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 19 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 20:
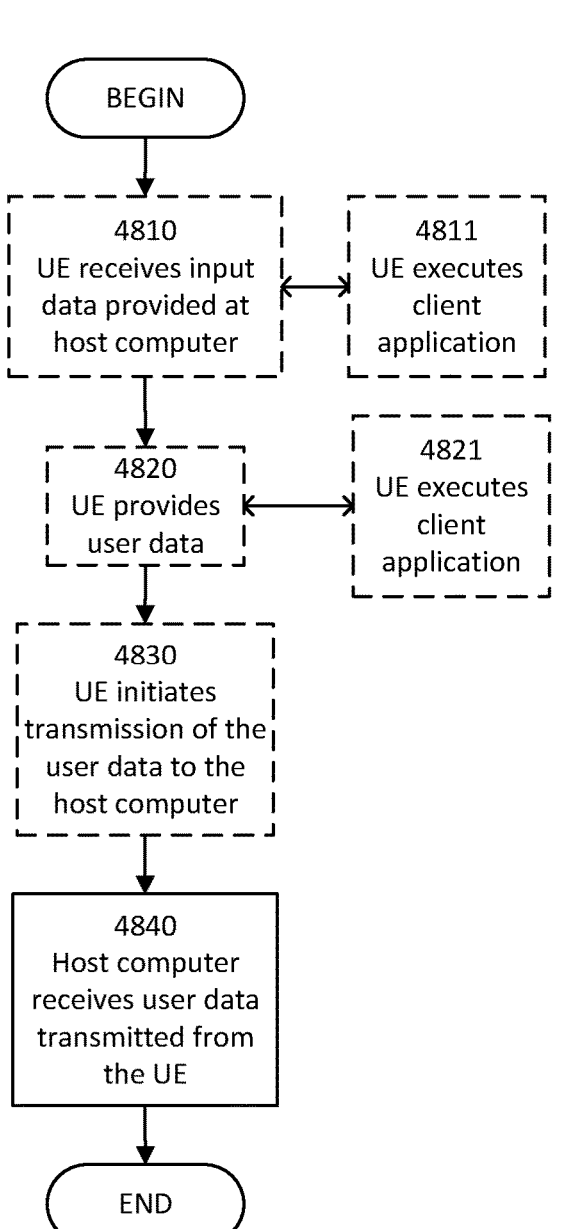
FIG. 20 is a block diagram of methods implemented in a communication system including a host computer, a base station and a user equipment in accordance with some embodiments.

FIG. 20 illustrates methods implemented in a communication system including a host computer, a base station and a user equipment in accordance with some embodiments FIG. 20 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 20 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 21:
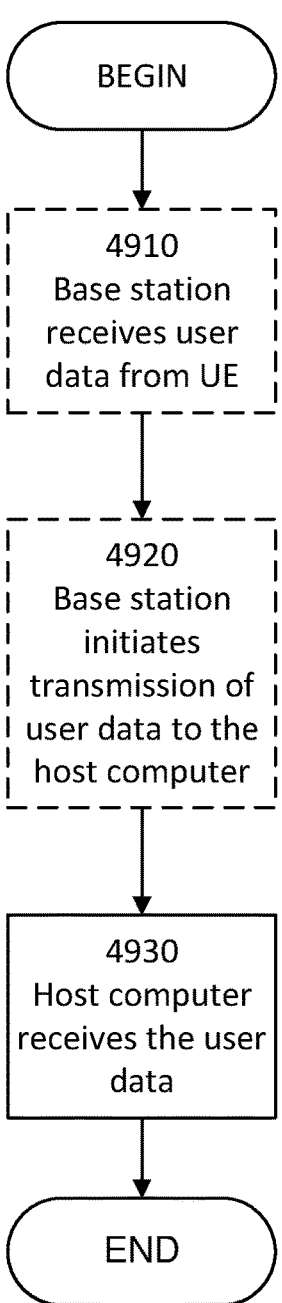
FIG. 21 is a block diagram of methods implemented in a communication system including a host computer, a base station and a user equipment in accordance with some embodiments.

FIG. 21 illustrates methods implemented in a communication system including a host computer, a base station and a user equipment in accordance with some embodiments FIG. 21 is a flowchart illustrating a method implemented in a communication system, in accordance with one embodiment. The communication system includes a host computer, a base station and a UE which may be those described with reference to FIGS. 16 and 17. For simplicity of the present disclosure, only drawing references to FIG. 21 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

What is claimed is:

1. A method of operating a wireless device that is configured to perform a timing measurement procedure that involves transmission of a reference signal during a timing measurement period, the method comprising:

determining that the wireless device is configured for antenna port switching of an antenna port configuration for transmitting the reference signal during the timing measurement period; and in response to determining that the wireless device is configured for antenna port switching of the antenna port configuration for transmitting the reference signal during the timing measurement period, adapting a configuration for antenna port switching by wherein limiting the number of antenna port switching actions during the timing measurement period comprises limiting the number of antenna port switching actions during the timing measurement period to less than or equal to a maximum number of port switching actions.

2. The method of claim 1, wherein the wireless device is configured to switch from a first antenna port configuration for transmitting the reference signal to a second antenna port configuration for transmitting the reference signal during the timing measurement period.

3. The method of claim 1, wherein the maximum number of port switching actions is one.

4. The method of claim 1, wherein the maximum number of port switching actions is provided by a network node, is predefined, or is autonomously determined by the wireless device.

5. The method of claim 1, wherein adapting the configuration for antenna port switching comprises not performing antenna port switching during the timing measurement period.

6. The method of claim 1, wherein adapting the timing measurement procedure during the timing measurement period comprises discarding, stopping or abandoning the timing measurement procedure in response to a number of antenna port switching actions exceeding a threshold number of antenna port switching actions.

7. The method of claim 1, wherein adapting the timing measurement procedure during the timing measurement period comprises relaxing a measurement requirement for the timing measurement during the timing measurement period.

8. The method of claim 7, wherein adapting the timing measurement procedure during the timing measurement period comprises:

restarting the timing measurement procedure;

compensating timing measurements based on the antenna port switching;

extending the timing measurement period and/or;

performing timing measurements during the timing measurement period only based on reference signals transmitted using a single antenna port configuration.

9. A method of operating a network node that serves a wireless device that is configured to transmit a reference signal during a timing measurement period, the method comprising:

determining that the wireless device is configured for antenna port switching of an antenna port configuration for transmitting the reference signal during the timing measurement period;

adapting a timing measurement procedure during the timing measurement period in response to determining that the wireless device is configured for antenna port switching of the antenna port configuration for transmitting the reference signal during the timing measurement period;

determining that the wireless device has performed a number of antenna port switching actions during the timing measurement period that is greater than a threshold number of antenna port switching actions; and in response to determining that the wireless device has performed the number of antenna port switching actions during the timing measurement period that is greater than the threshold number of antenna port switching actions, stopping the timing measurement procedure.

10. The method of claim 9, further comprising transmitting information about the adaptation of the timing measurement procedure to another network node.

11. The method of claim 9, wherein adapting the timing measurement procedure comprises requesting the wireless device not to perform antenna port switching during the timing measurement period.

12. The method of claim 9, further comprising:

discarding timing measurement samples made during the timing measurement period.

13. The method of claim 9, further comprising:

restarting the timing measurement procedure after stopping the timing measurement procedure.

* * * * *